(12) United States Patent
Furuya et al.

(10) Patent No.: US 7,733,927 B2
(45) Date of Patent: Jun. 8, 2010

(54) LASER LIGHT SOURCE DEVICE AND IMAGE DISPLAY DEVICE

(75) Inventors: Hiroyuki Furuya, Nara (JP); Kiminori Mizuuchi, Osaka (JP); Kazuhisa Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 201 days.

(21) Appl. No.: 11/812,732

(22) Filed: Jun. 21, 2007

(65) Prior Publication Data

US 2008/0013574 A1 Jan. 17, 2008

(30) Foreign Application Priority Data

Jun. 22, 2006 (JP) .............................. 2006-172138

(51) Int. Cl.
*H01S 3/10* (2006.01)
(52) U.S. Cl. ........................................................ 372/21
(58) Field of Classification Search .................... 372/21
See application file for complete search history.

(56) References Cited

U.S. PATENT DOCUMENTS

| | | | |
|---|---|---|---|
| 5,323,404 | A | 6/1994 | Grubb |
| 5,796,764 | A * | 8/1998 | Corsini et al. .................... 372/6 |
| 6,229,828 | B1 * | 5/2001 | Sanders et al. .................. 372/22 |
| 6,432,736 | B1 | 8/2002 | Lee et al. |
| 6,594,298 | B2 | 7/2003 | Ryu et al. |
| 6,597,711 | B2 | 7/2003 | Fernald et al. |
| 6,897,992 | B2 | 5/2005 | Kikuchi |
| 2005/0002433 | A1 * | 1/2005 | Mooradian .................... 372/97 |

FOREIGN PATENT DOCUMENTS

| | | |
|---|---|---|
| JP | 9-121069 | 5/1997 |
| JP | 3689483 | 10/1997 |
| JP | 10-294517 | 11/1998 |
| JP | 2004-138669 | 5/2004 |
| JP | 2004-144794 | 5/2004 |
| JP | 2004-151133 | 5/2004 |
| WO | 01/54238 | 7/2001 |

\* cited by examiner

*Primary Examiner*—Minsun Harvey
*Assistant Examiner*—Patrick Stafford
(74) *Attorney, Agent, or Firm*—Wenderoth, Lind & Ponack, L.L.P.

(57) ABSTRACT

The present invention concerns a laser light source device capable of multiwavelength oscillation. This laser light source device is provided with a laser light source; a laser cavity including a fiber, a first fiber grating provided at a side of the fiber toward the laser light source and having a plurality of reflection peaks, and a second fiber grating provided at a light emission end of the fiber and having a plurality of reflection peaks: a wavelength converter for converting a fundamental wave emitted from the laser cavity into a harmonic wave; a reflection wavelength varying unit capable of shifting the reflection wavelengths of the reflection peaks of the second fiber grating; and a controller for controlling phase matching conditions of the wavelength converter. Intervals between adjacent reflection peaks of the first fiber grating are different from those between adjacent reflection peaks of the second fiber grating.

16 Claims, 24 Drawing Sheets

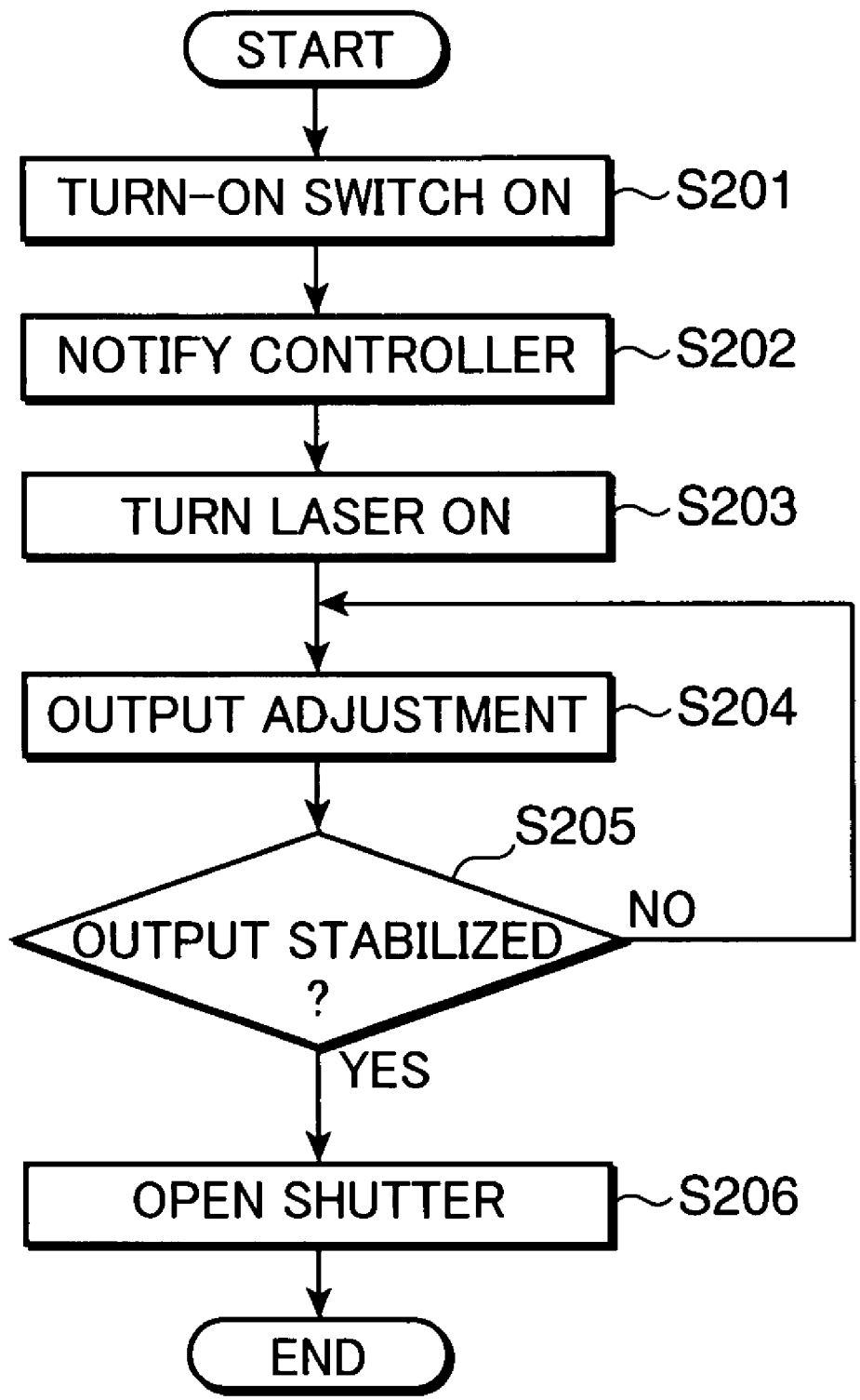

LASER LIGHT SOURCE DEVICE AND IMAGE DISPLAY DEVICE

BACKGROUND OF THE INVENTION

1. Field of the Invention

The present invention relates to a laser light source device for obtaining a stable and high-output laser light by combining a fiber laser and a wavelength conversion element, and an image display device using such a laser light source device.

2. Description of the Background Art

High-output visible light sources having strong monochromaticity are necessary in realizing large-scale displays, high-luminance displays and the like. Out of three primary colors of red, green and blue, a red high-output semiconductor laser used in a DVD recorder or the like can be utilized as a small-scale light source having high productivity for a red color. However, for a green or blue light source, realization by means of a semiconductor laser or the like is difficult and there is a demand for a small-scale light source having high productivity.

For such a light source, a wavelength conversion device constructed by combining a fiber laser and a wavelength conversion element is realized as a low-output visible light source. Green and blue small-scale light sources are well known which use a semiconductor laser as an excitation light source for exciting the fiber laser and a nonlinear optical crystal as the wavelength conversion element.

On a laser display utilizing such high-output laser light sources, vivid images with high color purity can be displayed by utilizing laser light sources having suitable wavelengths since lights of the respective red, green and blue light sources are monochromatic lights. Such laser light sources enable the miniaturization of light sources by the use of lasers and the miniaturization of optical systems because lights can be easily focused, whereby palmtop image display devices can be realized.

On the other hand, the use of a laser having high coherency causes coherence noise called speckle noise to be formed in a displayed image. Accordingly, there have been proposed methods for removing speckle noise according to which the speckle noise is reduced by differentiating light paths depending on polarization directions using a prism (Japanese Unexamined Patent Publication No. 2004-151133); the wavefront of a light irradiated to a screen is made random by swinging an optical component to change a light path of a light source (Japanese Unexamined Patent Publication No. 2004-138669); a spectrum is caused to have a sideband using a light modulator to broaden the apparent light spectrum (Japanese Unexamined Patent Publication No. H09-121069), an oscillation wavelength is operated using the injection seeding technology to a solid-state laser (Japanese Unexamined Patent Publication No. H10-294517); and a semiconductor laser having a plurality of wavelengths is used as a module (Japanese Unexamined Patent Publication No. 2004-144794).

On the other hand, there have been proposed a fiber laser using a Raman fiber (WO 01/54238) and a semiconductor laser using a reflection element called a sampled grating which is a diffraction grating having a plurality of reflection wavelengths to realize a semiconductor laser capable of simultaneous multiwavelength oscillation (Japanese Patent No. 3689483). The construction of the fiber laser disclosed in WO 01/54238 is shown in FIG. 26A. This laser includes a sampled grating 2001, a Raman fiber 2002 and a broadband dielectric mirror 2003. By exciting the Raman fiber 2002 with an excitation light 2004, a light of $\lambda 1$ is generated by the resonance between one reflection peak of the sampled grating 2001 and the broadband dielectric mirror 2003. Using this light of $\lambda 1$ as an excitation light, a light of $\lambda 2$ is generated by the resonance between another reflection peak of the sampled grating 2001 and the broadband dielectric mirror 2003. In this way, lights of $\lambda 3$, $\lambda 4$ are successively generated and a light 2005 of $\lambda 5$ is finally extracted.

The construction disclosed in Japanese Patent No. 3689483 is shown in FIG. 26B. The combined construction of a Raman fiber and a sampled grating in FIG. 26B aims to generate an excitation light of a desired wavelength by a Raman shift. An emission area 2007 and a reflection area 2008 are formed on a semiconductor substrate 2006, wherein the reflection area 2008 has a sampled grating structure so as to be capable of simultaneous oscillation at a plurality of wavelengths. Control means (refractive index changing electrode) 2009 for changing the refractive index of the reflection area 2008 is provided in the reflection area 2008, so that the wavelength of the reflection area 2008 can be shifted.

U.S. Pat. No. 6,432,736 discloses an example of a semiconductor laser array in which two reflection areas having a sampled grating structure are provided to switch an oscillation wavelength. Further, U.S. Pat. No. 6,597,711 discloses an example in which the construction of U.S. Pat. No. 6,432,736 is applied to a fiber laser.

However, if the aforementioned prior arts are applied to a method for reducing speckle noise by using broadband light sources or light sources having a plurality of oscillation wavelengths, there have been problems of a higher cost, an enlarged device size and the like since a plurality of laser light sources are required. The semiconductor laser and the fiber laser light source using the sampled grating cannot obtain as high outputs as can be used as light sources for laser displays and, in addition, determine the oscillation wavelength by controlling the two reflection areas. Therefore, there has been a problem of complicating a control method for simultaneously controlling the oscillation wavelength and the laser output. There is another problem that a wavelength change by the control of the reflection areas is sensitive to external temperature. For the example of the fiber laser light source, a large stress needs to be applied to the fiber grating in order to obtain a large variable range, making the breakage of the fiber possible, wherefore there is a problem in the reliability of the fiber. There is an additional problem that the wavelength dependency of a gain of a laser medium triggers an oscillation output change in the case of switching the wavelength.

On the other hand, the aforementioned laser light source having a plurality of oscillation wavelengths has started being used in the medical field. Laser lights of different wavelengths are needed depending on treatments in the medical field. The wavelengths of laser lights particularly used in eye clinics are in the neighborhood of 530 nm, in the neighborhood of 600 nm and in the neighborhood of 1 μm. Laser lights in the neighborhood of 530 nm are used for the retinal coagulation of eyes, those in the neighborhood of 600 nm for the stoppage of fundal hemorrhage, and those in the neighborhood of 1 μm for cataract surgeries. Developments on laser light sources used for such ophthalmic treatments are being advanced at present and, particularly, there has been a need for a laser application device capable of obtaining laser lights of many wavelengths so as to cope with many treatments by one laser light source. Japanese Unexamined Patent Publication No. 2006-122081 discloses a laser device capable of multiwavelength oscillation by shifting an oscillation wavelength toward a longer wavelength side using a Raman fiber. Besides, lasers and the like have been developed which realize multiwavelength oscillation by utilizing a plurality of fluorescence peaks of a solid-state laser.

However, the above laser device capable of multiwavelength oscillation using the Raman fiber cannot simultaneously generate lights of two wavelengths. Further, since the gain of the Raman fiber laser is greatest at a wavelength of 1000 to 1100 nm, in the case of generating a light of 1100 to 1200 nm necessary for an orange light, a light having a broad emission spectrum of 1000 to 1100 nm is also generated. This has caused a problem of breaking a laser oscillator by the pulse oscillation. On the other hand, in the aforementioned laser capable of multiwavelength oscillation using the solid-state laser, the optical systems need to be switched for each oscillation wavelength, which has caused a problem of difficulty to switch to a desired wavelength in a moment. Further, since the property of the laser light largely differs at each oscillation wavelength, there has been a problem that obtained maximum outputs cannot be constant.

Further, in the construction of the conventional laser light source for medical use, a laser light generated by the laser oscillator has been propagated to a surgical handpiece by means of a hollow fiber or the like after having a fundamental wave thereof wavelength-converted into a visible light by a wavelength conversion element. However, about 30% of the visible light is lost to reduce propagation efficiency due to the coupling loss of the visible light from the laser oscillator to the hollow fiber and a propagation loss in the fiber. There has been also a problem that the handpiece is difficult to handle due to the handling of the fiber.

SUMMARY OF THE INVENTION

An object of the present invention is to provide a highly reliably laser light source capable of generating laser lights while switching a wavelength among a plurality of wavelengths and having as large a light output as W-class.

One aspect of the present invention is directed to a laser light source device, comprising a laser light source for emitting an excitation light; a laser cavity including a fiber which contains a laser-active substance and on which the excitation light from the laser light source is incident, a first fiber grating provided at a side of the fiber toward the laser light source and having a plurality of reflection peaks, and a second fiber grating provided at a light emission end of the fiber and having a plurality of reflection peaks; a wavelength converter for converting a fundamental wave emitted from the laser cavity into a harmonic wave; a reflection wavelength varying unit capable of shifting the reflection wavelengths of the reflection peaks of the second fiber grating; and a controller for controlling the oscillation wavelength of the laser cavity by means of the reflection wavelength varying unit and controlling a phase matching condition of the wavelength converter, intervals between adjacent reflection peaks of the first fiber grating being different from those between adjacent reflection peaks of the second fiber grating.

In the above laser light source device, each of the first and second fiber gratings has a plurality of reflection peaks, and the intervals between adjacent reflection peaks of the first fiber grating are set to be different from those between adjacent reflection peaks of the second fiber grating. Therefore, the oscillation wavelength of the laser cavity can be switched by shifting only the reflection wavelengths of the reflection peaks of the second fiber grating.

BRIEF DESCRIPTION OF THE DRAWINGS

FIG. 21 is a flow chart showing the procedure of a light irradiation process of the laser light irradiator.

DETAILED DESCRIPTION OF PREFERRED EMBODIMENTS OF THE PRESENT INVENTION

Figure 1:
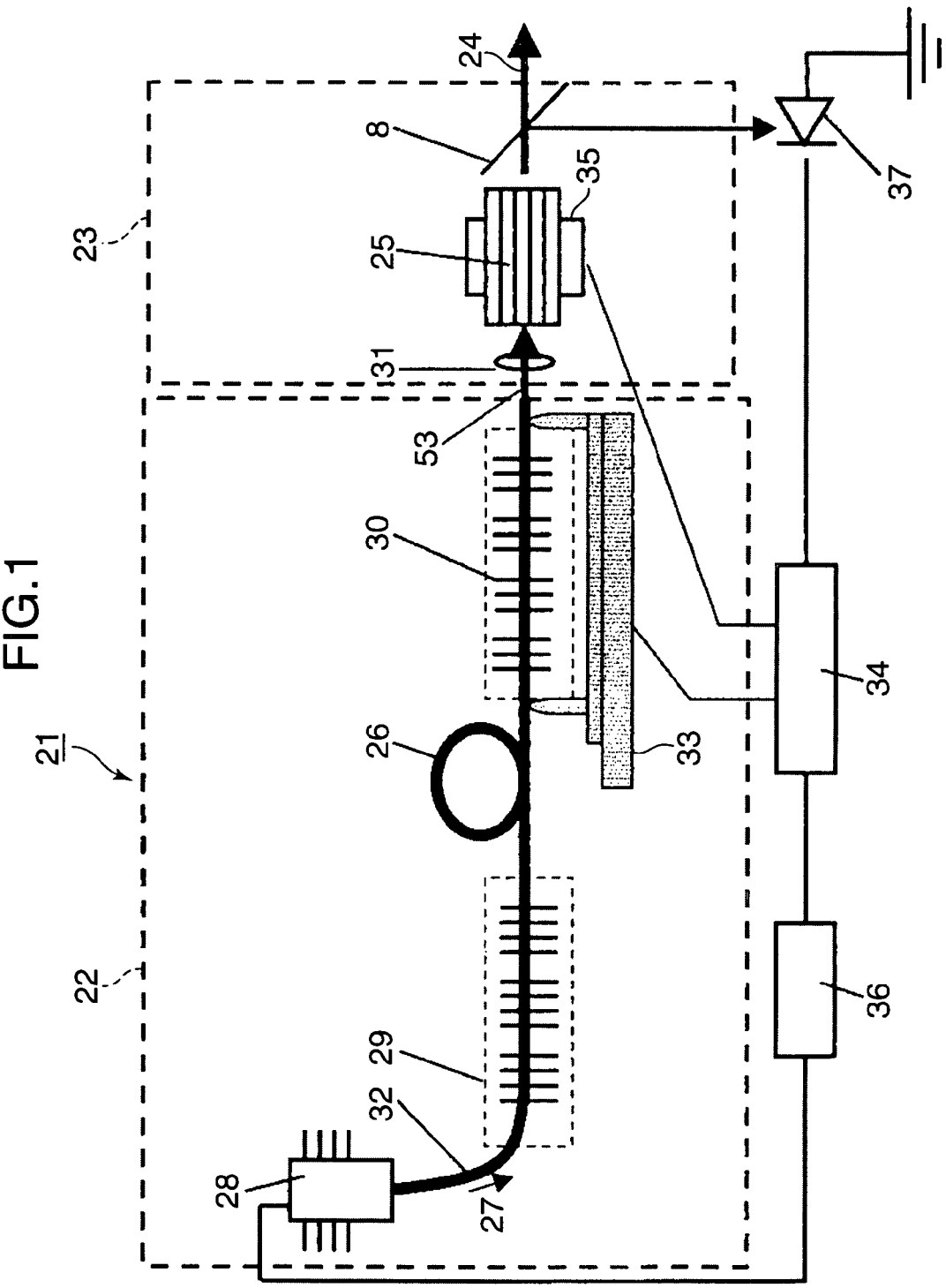
FIG. 1 is a diagram showing a schematic construction of a laser light source according to a first embodiment of the invention.

Hereinafter, embodiments of the present invention are described with reference to the accompanying drawings. It should be noted that the same parts are identified by the same reference numerals and those assigned with the same reference numerals in the drawings may not be repeatedly described in some cases.

First Embodiment

FIG. 1 is a diagram showing a schematic construction of a laser light source according to a first embodiment of the present invention. In FIG. 1, a laser light source 21 of this embodiment is provided with a fiber laser 22, a wavelength converter including a wavelength conversion element 25 for converting a fundamental wave 53 emitted from the fiber laser 22 into a harmonic wave 24, and a controller 34.

The fiber laser 22 includes a fiber 26 containing a laser-active substance, an excitation laser 28 for emitting an excitation light 27 to the fiber 26 via a fiber 32, and a first fiber grating 29 and a second fiber grating 30 formed at the opposite ends of the fiber 26 and constructing a laser cavity together with the fiber 26.

The first fiber grating 29 has a plurality of broadband reflection peaks and the bandwidths of the respective reflection peaks are 0.5 to 3 nm. The second fiber grating 30 also has a plurality of broadband reflection peaks and the bandwidths of the respective reflection peaks are 0.2 nm or shorter. The cavity of the fiber laser 22 amplifies and emits the fundamental wave 53 using the reflection peaks selected one each from the first and second fiber gratings 29, 30 as two reflecting surfaces. The bandwidth of each reflection peak of the second fiber grating 30 is preferably equal to or below 0.2 nm, more preferably equal to or below 0.15 nm. This is because the wavelength conversion element 25 can more efficiently perform wavelength conversion as the bandwidth of the second fiber grating 30 becomes narrower to satisfy a wavelength permissible range at the time of the wavelength conversion by the wavelength conversion element 25. Since the wavelength band of the oscillated fundamental wave 53 needs to be narrow in such a wavelength conversion application technology, the wavelength band of the second fiber grating 30 needs to be narrowed. Accordingly, a rough control can be set for the second fiber grating 30 at a narrower band side by setting the bandwidth of the first fiber grating 20 to about the tenfold of that of the second fiber grating 30, i.e. by setting the bandwidth of the first fiber grating 29 to 0.5 to 3 nm, more preferably to 0.5 to 2 nm. The bandwidth of the first fiber grating 29 is preferably set to 0.5 to 2 nm since ripples seen in the top shape of the band become larger if the bandwidth of the first fiber grating 29 is excessively widened.

The second fiber grating 30 is arranged on a reflection wavelength varying unit 33. The reflection wavelength varying unit 33 has a stress applying mechanism for applying a tensile stress to the second fiber grating 30. By applying a tensile stress to the second fiber grating 30, the reflection wavelength of the second fiber grating 30 is shifted, thereby changing the oscillation wavelength of the fiber laser 22. One end of the second fiber grating 30 is fixed on a base and the other end thereof is fixed on a one-axis stage driven by a pulse motor. A movable direction of the stage and a light propagation direction of the second fiber grating 30 are parallel, and a tensile stress can be applied to the second fiber grating 30 by the rotation of the pulse motor. Although the reflection wavelength varying unit 33 is provided with the stress applying mechanism here, this embodiment is not limited thereto. For example, the reflection wavelength varying unit 33 may be provided with a temperature controlling mechanism using a Peltier element and the reflection wavelength may be shifted by controlling the temperature of the second fiber grating 30.

Figure 2A:
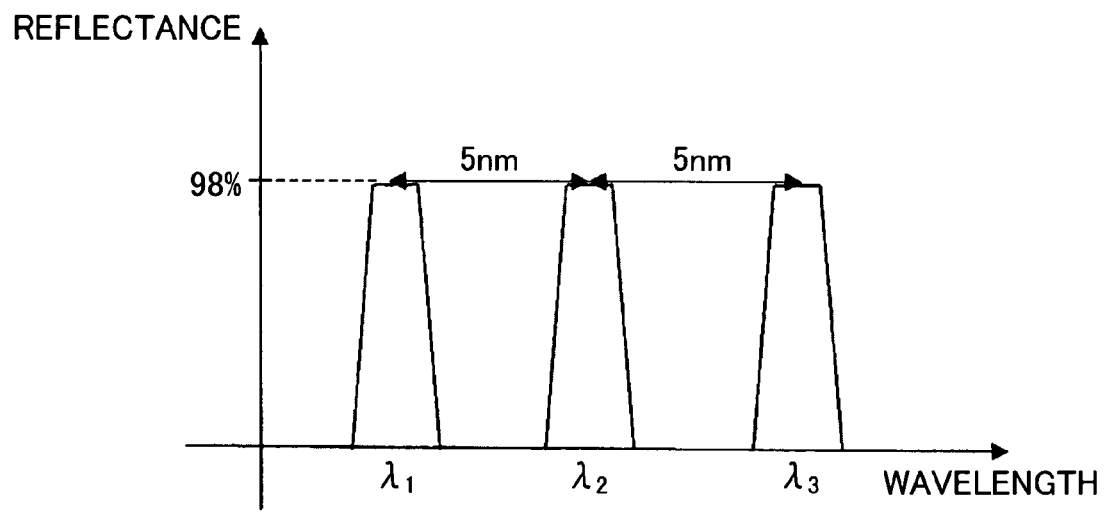
FIG. 2A is a graph showing a reflection spectrum of a first fiber grating.
Figure 2B:
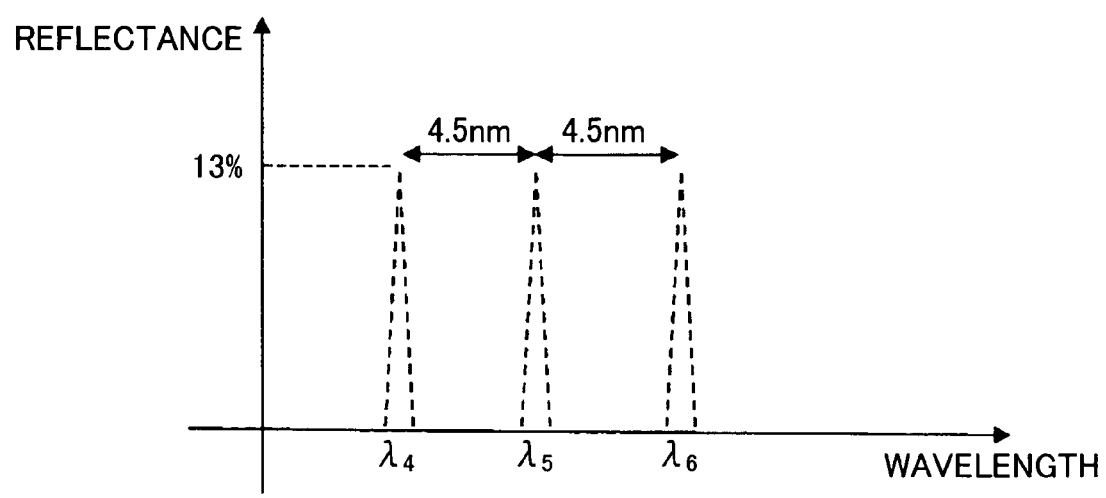
FIG. 2B is a graph showing a reflection spectrum of a second fiber grating.

Next, the respective plurality of reflection peaks of each of the first and second fiber gratings 29, 30 are specifically described. A reflection spectrum of the first fiber grating 29 is shown in FIG. 2A and that of the second fiber grating 30 is shown in FIG. 2B. In FIG. 2A, the first fiber grating 29 has three center wavelengths $\lambda 1$, $\lambda 2$ and $\lambda 3$ and a reflectance of 98% or higher, i.e. serves as a high-reflect (HR) mirror. On the other hand, in FIG. 2B, the second fiber grating 30 has three center wavelengths $\lambda 4$, $\lambda 5$ and $\lambda 6$ and a reflectance of about 12%. The reflectance of about 12% is necessary because the second fiber grating 30 functions to feed a part of an oscillation light to the fiber 26. In FIGS. 2A and 2B, the first fiber grating 29 has a bandwidth of 0.5 nm and such a property that the center wavelengths are spaced apart at intervals of 5 nm. On the other hand, the second fiber grating 30 has a bandwidth of 0.06 nm and such a property that the center wavelengths are spaced apart at intervals of 4.5 nm. The intervals between the respective center wavelengths of the first and second fiber gratings 29, 30 are suitably set based on an oscillation wavelength required for the fiber laser 22. In FIGS. 2A and 2B, the first and second fiber gratings 29, 30 are kept at room temperature (25° C.) and $\lambda 1=\lambda 4$ if no tensile stress is applied to the second fiber grating 30.

At this time, if two semiconductor lasers having a threshold current of 0.45 A, a maximum output of 7 W and a wavelength of 915 nm were used as the excitation laser 28, the fundamental wave 53 having an output of 7.2 W could be realized. By using an excitation wavelength of 915 nm, the fundamental wave 53 can be stably outputted by a simple cooling mechanism using a cooling fan and a blast fan.

Figure 3A:
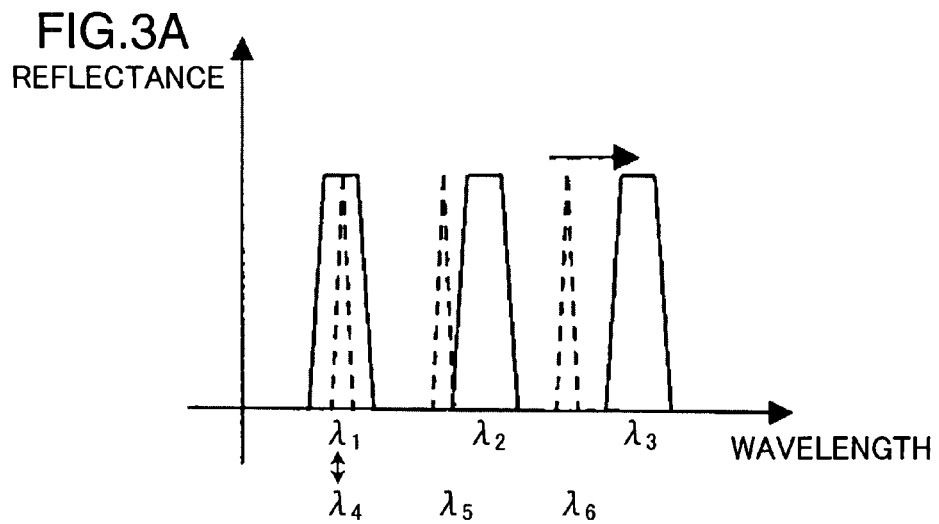
FIGS. 3A to 3C are graphs showing an operation of selecting the wavelength of the laser light source according to the first embodiment of the invention.
Figure 3B:
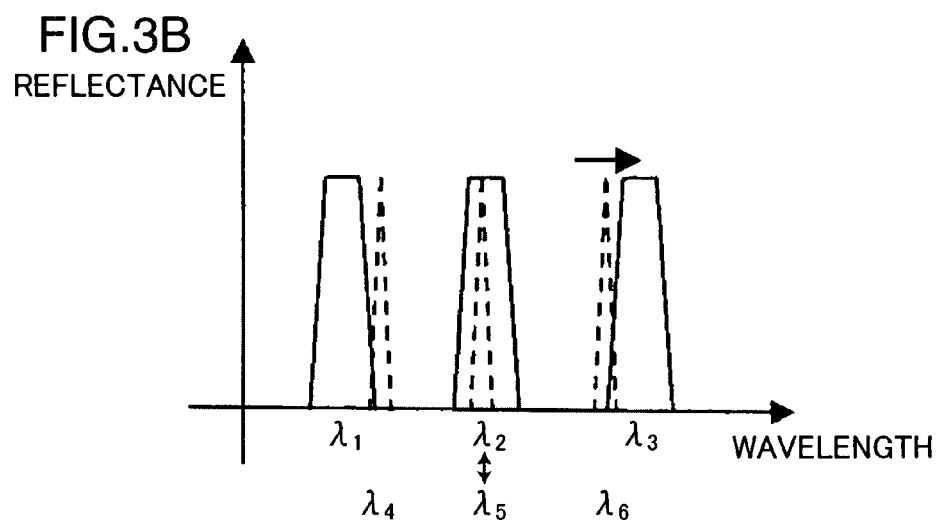
Figure 3C:
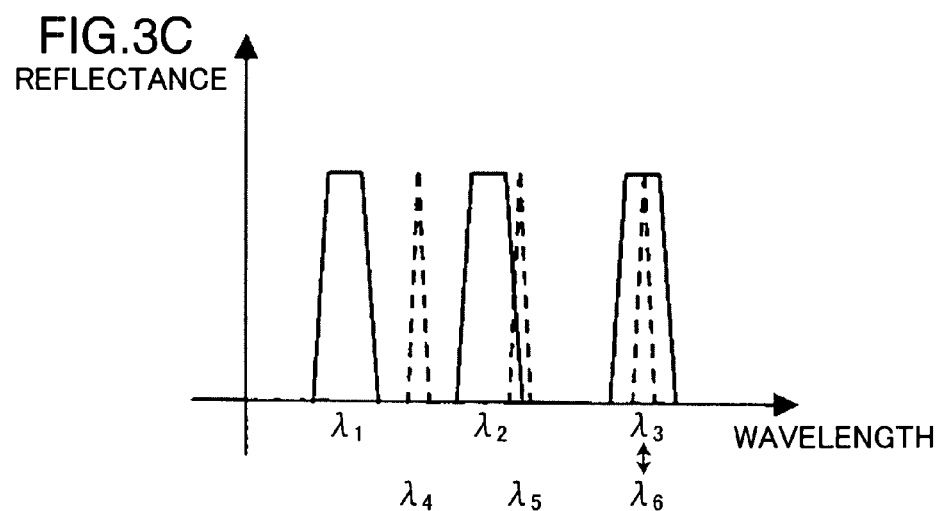

Next, an operation of selecting the wavelength of the laser light source according to this embodiment is descried. Here is described the case where the first and second fiber gratings 29, having the reflection peaks shown in FIGS. 2A and 2B are used. FIGS. 3A to 3C are graphs showing the operation of selecting the wavelength of the laser light source according to this embodiment, wherein FIG. 3A shows a state at room temperature where no tensile stress is applied to the second fiber grating 30, FIG. 3B shows a state at room temperature where the reflection wavelength of the second fiber grating 30 is shifted only by 0.5 nm by applying a tensile stress to the second fiber grating 30, and FIG. 3C shows a state at room temperature where a tensile stress is further applied to the second fiber grating 30 to shift the reflection wavelength of the second fiber grating 30 by 0.5 nm.

First, in FIG. 3A, the center wavelength $\lambda 1$ of the first fiber grating 29 and the center wavelength $\lambda 4$ of the second fiber grating 30 coincide in FIG. 3A. Thus, the fiber laser 22 oscillates at $\lambda 1$ (=$\lambda 4$).

Next, in FIG. 3B, the reflection wavelength of the second fiber grating 30 is shifted through the application of a tensile stress by the reflection wavelength varying unit 33. As a result, the center wavelength $\lambda 2$ of the first fiber grating 29 and the center wavelength $\lambda 5$ of the second fiber grating 30 come to coincide. Thus, the fiber laser 22 oscillates at $\lambda 2$ (=$\lambda 5$). In other words, the oscillation wavelength of the fiber laser 22 can be shifted by 5 nm only by shifting the reflection wavelength of the second fiber grating 30 by as small as 0.5 nm.

In FIG. 3C, the reflection wavelength of the second fiber grating 30 is further shifted through the further application of a tensile stress by the reflection wavelength varying unit 33. As a result, the center wavelength $\lambda 3$ of the first fiber grating 29 and the center wavelength $\lambda 6$ of the second fiber grating 30 come to coincide. Thus, the fiber laser 22 oscillates at $\lambda 3$ (=$\lambda 6$) and the oscillation wavelength thereof is further shifted by 5 nm from the state shown in FIG. 3B.

In other words, the oscillation wavelength of the fiber laser 22 can be shifted by 10 nm by shifting the reflection wavelength of the second fiber grating 30 by 1 nm. In this way, the oscillation wavelength of the fiber laser 22 can be switched by 5 nm each time, by a total of 10 nm, although these changes are discrete. A shift amount of the oscillation wavelength of the fiber laser 22 can be arbitrarily set depending on the designs of the first and second fiber gratings 29, 30.

As described above, by combining the first fiber grating 29 as a reflector having a high reflectance and a wide bandwidth and the second fiber grating 30 as a reflector having a low reflectance and a narrow bandwidth, it becomes unnecessary to control the oscillation wavelength of the fiber laser 22 by finely adjusting both reflectors and it becomes possible to switch the oscillation wavelength only by controlling one reflector. In addition, with the conventional technology, the oscillation wavelength needs to be monitored based on the laser output, making it difficult to distinguish a change of the oscillation wavelength and a change of the laser output itself. In this embodiment, it is sufficient to control only the change of the laser output itself (automatic power control: APC) by eliminating the need to monitor the oscillation wavelength. Accordingly, the laser output can be more easily controlled. Further, with the conventional technology, there have been cases where the oscillation wavelength inadvertently switches because the reflection wavelength of the fiber grating is sensitive to an external temperature variation. In this embodiment, this problem can also be prevented by making the bandwidth of the first fiber grating 29 wider than that of the second fiber grating 30.

Figure 4:
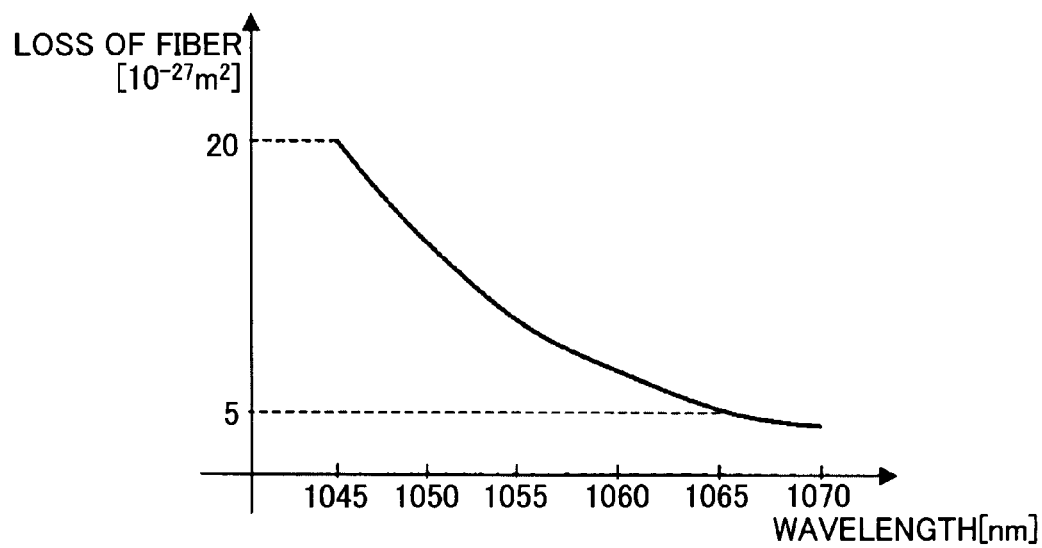
FIG. 4 is a graph showing a relationship between the oscillation wavelength and loss of a Yb doped fiber.
Figure 5:
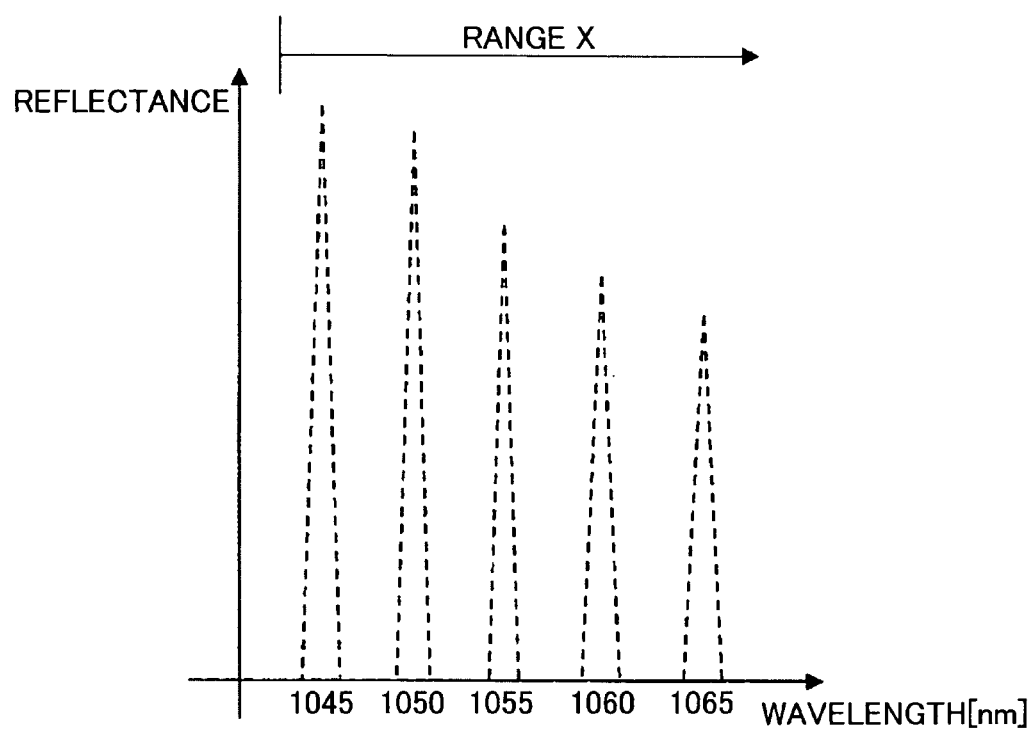
FIG. 5 is a graph showing a relationship between the reflection wavelength and reflectance of the second fiber grating.

In the fiber laser used in the laser light source according to this embodiment, an oscillation efficiency is known to differ at each oscillation wavelength due to the absorption of the fiber by the doping of Yb that is a laser-active substance. FIG. 4 shows a relationship between the oscillation wavelength and loss of a Yb doped fiber. As shown in FIG. 4, in an oscillation wavelength of 1045 to 1070 nm, the longer the oscillation wavelength, the smaller the loss of the fiber. Thus, there is a tendency to increase the oscillation efficiency as the oscillation wavelength increases. Accordingly, a reduction in the oscillation efficiency needs to be prevented in the case of shorting the oscillation wavelength. In this embodiment, the reflectance of the second fiber grating 30 is increased for this reduction in the oscillation efficiency. Specifically, the reduction in the oscillation efficiency is prevented by improving the reflectance of the second fiber grating 30 to increase the oscillation light fed back to the fiber 26. The second fiber grating 30 having a plurality of reflection wavelengths can change the lengths of the respective gratings corresponding to the respective reflection wavelengths to change the reflectances of the respective gratings. The reflectances of the respective gratings increase by the increased lengths of the respective gratings. In other words, the reflectances of the respective gratings are increased in the case of short oscillation wavelengths (1045 nm in the case of this embodiment) while being decreased in the case of longer oscillation wavelengths (1070 nm in the case of this embodiment), whereby the reduction in the oscillation efficiency can be suppressed. In this way, an increase in a drive current amount of the excitation laser 28 by APC can be suppressed. In other words, lower power consumption can be realized. FIG. 5 shows an exemplary relationship between the reflection wavelength and reflectance of the second fiber grating 30.

In FIG. 5, in the case of designing the fiber laser 22 so as to oscillate in a wavelength range X of from 1045 nm to 1070 nm at 5 nm intervals, the reduction in the oscillation efficiency of the fiber laser 22 can be suppressed and an output variation of the fundamental wave 53 caused by a variation of the oscillation wavelength of the fiber laser 22 can be curbed to 5% or lower by setting the largest reflection peak of the second fiber grating 30 at 1045 nm and successively allotting reflection wavelengths in an decreasing order at 5 nm intervals.

Next, the wavelength converter 23 for generating the harmonic wave 24 of the fundamental wave 53 emitted from the fiber laser 22 is described. As shown in FIG. 1, the wavelength converter 23 includes the wavelength conversion element 25, a condenser lens 31, a beam splitter 8 and a wavelength conversion element holder 35. Although the condenser lens 31 is provided in the wavelength converter 23 in this embodiment, it may be provided in the fiber laser 22.

When a laser light of the fundamental wave 53 is outputted by the fiber laser 22, it is collected by the condenser lens 31 to be incident on the wavelength conversion element 25. When the fundamental wave 53 from the fiber laser 22 becomes an incident wave and is converted by the nonlinear optical effect of the wavelength conversion element 25, it becomes the harmonic wave 24 having half the wavelength of the fundamental wave 53. A part of the converted harmonic wave 24 having passed through the beam splitter 8 is almost entirely emitted as an output light of the laser light source 21 while the remaining part is reflected by the beam splitter 8.

The part of the harmonic wave 24 reflected by the beam splitter 8 is received and converted into an electrical signal by a light receiving element 37 to be used for the monitoring of the output light of the wavelength conversion element 25. The controller 34 adjusts a drive current of the excitation laser 28 by the control of an excitation laser current source 36 so that the intensity of this converted signal is increased to obtain a desired output in the wavelength conversion element 25. Then, the intensity of the excitation light 27 from the excitation laser 28 is adjusted to adjust the output intensity of the fundamental wave 53 of the fiber laser 22, with the result that the output intensity of the laser light source 21 can be adjusted. In this way, the intensity of the output of the laser light source 21 can be kept at a constant level and the so-called automatic power control (APC) is stably carried out. It should be noted that a light receiving element may be arranged at a side of the fiber 26 more outward than the second fiber grating 30 in order to more accurately control the output intensity of the laser light source 21 by the APC operation. In this way, a slight leakage of the fundamental wave 53 without being reflected by the second fiber grating 30 can be detected. By respectively estimating the overall intensities of the excitation light 27 and the fundamental wave 53 based on this detection data, the controller 34 can automatically control the output intensity of the laser light source 21 by adjusting the drive current of the excitation laser 28 by the control of the excitation laser current source 36.

It should be noted that the detection of the fundamental wave 53 is not limitedly made by the construction in which the light receiving element is arranged outside the second fiber grating 30. Instead, a branched light of the fundamental wave 53 emitted from the second fiber grating 30 may be detected. Alternatively, an output of the fundamental wave 53 having passed through the first fiber grating 29 may be detected by a light receiving element. Further, the output of the fundamental wave 53 may be controlled by reflecting the excitation light 27 of the excitation laser 28 by means of an extraction mirror and detecting a part of the excitation light 27 by means of a light receiving element. By adopting these constructions, the output from the laser light source 21 can be further stably obtained by more accurately detecting the outputs of the excitation light 27 and the fundamental wave 53 to stably control the output of the fundamental wave 53.

Next, specific constructions of the wavelength conversion element 25 and the wavelength conversion element holder 35 of the wavelength converter 23 are described. In this embodiment, the oscillation wavelength of the fiber laser 22 for emitting the fundamental wave 53 is changed. To this end, it is necessary to change a phase matching condition of the nonlinear optical crystal used in the wavelength conversion element 25 of the wavelength converter 23 for generating the harmonic wave 24 according to the oscillation wavelength. In this embodiment is described the case where $KTiOPO_4$ (KTP) is used as an example of crystal using angle phase matching, $LiB_3O_5$ (LBO) as an example of crystal using temperature phase matching and $MgO:LiNbO_3$ as an example of crystal using quasi phase matching.

(In the Case of Using the Angle Phase Matching)

Figure 6A:
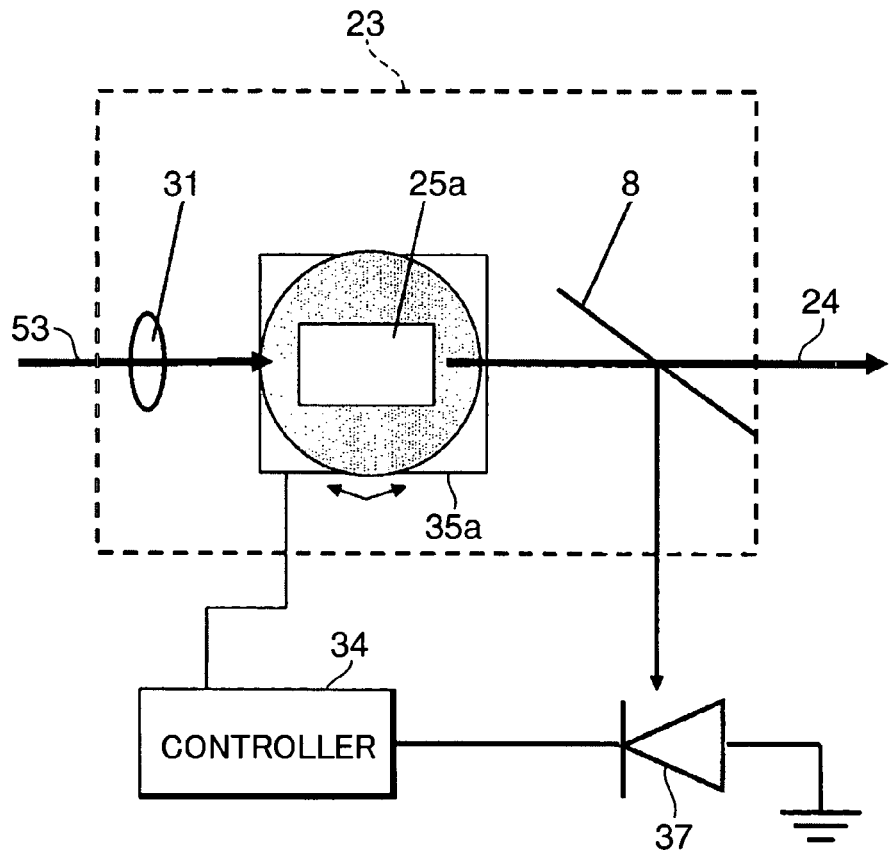
FIG. 6A is a schematic diagram showing one construction of a wavelength converter.

FIG. 6A shows a construction of the wavelength converter 23 in the case of using a nonlinear crystal using the angle phase matching as the wavelength conversion element 25. In FIG. 6A, the wavelength converter 23 includes a wavelength conversion element 25a, the condenser lens 31, the beam splitter 8 and a wavelength conversion element holder 35a. The wavelength conversion element 25a is formed by the angle phase matching of the KTP crystal, and the wavelength conversion element holder 35a has a rotary stage for rotating the wavelength conversion element 25a in the $\Phi$ direction on the crystal optical axis of the KTP crystal.

The oscillation wavelength of the fiber laser 22 was set at 1055 nm, 1060 nm, 1065 nm and 1070 nm and the KTP crystal constituting the wavelength conversion element 25a was used in type-II phase matching (angle $\theta$ between a z-axis and a fundamental wave incident direction is 90° in an xy-plane). The respective phase matching conditions were such that the phase matching angle $\Phi$ (angle between the fundamental wave incident angle and an x-axis: angle in the crystal) was 35°, 32.5°, 28.5° and 23.5°. It should be noted that this phase matching angle $\Phi$ varies about ±0.2° depending on the temperature of the crystal.

Figure 6B:
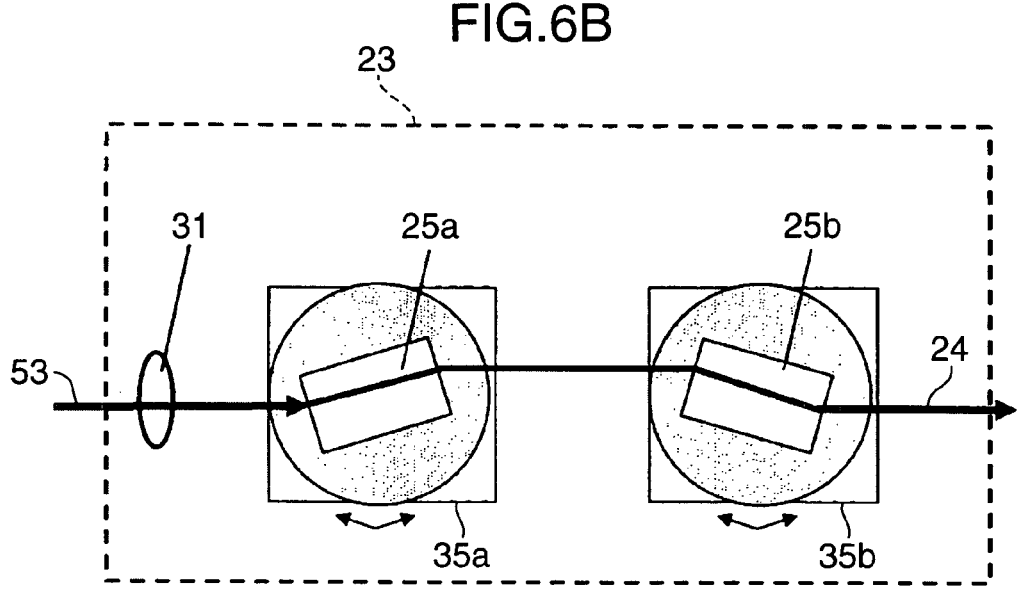
FIG. 6B is a schematic diagram showing another construction of the wavelength converter.

FIG. 6B shows another construction of the wavelength converter 23 in the case of using the nonlinear crystal using the angle phase matching as the wavelength conversion element 25. In FIG. 6B, the wavelength converter 23 includes the wavelength conversion element 25a, the condenser lens 31, the beam splitter 8, the wavelength conversion element holder 35a, a wavelength conversion element 25b and a wavelength conversion element holder 35b. Of course, the wavelength conversion element 25b is formed by the angle phase matching of the KTP crystal, and the wavelength conversion element holder 35b has a rotary stage for rotating the wavelength conversion element 25b in the $\Phi$ direction on the crystal optical axis of the KTP crystal. In other words, the construction of FIG. 6B is obtained by adding the wavelength conversion element 25b and the wavelength conversion element holder 35b to the construction of FIG. 6A. By this construction, a change of the optical axis caused by the rotation of the wavelength conversion element 25a can be suppressed by the rotation of the wavelength conversion element 25b.

(In the Case of Using the Temperature Phase Matching)

Figure 7:
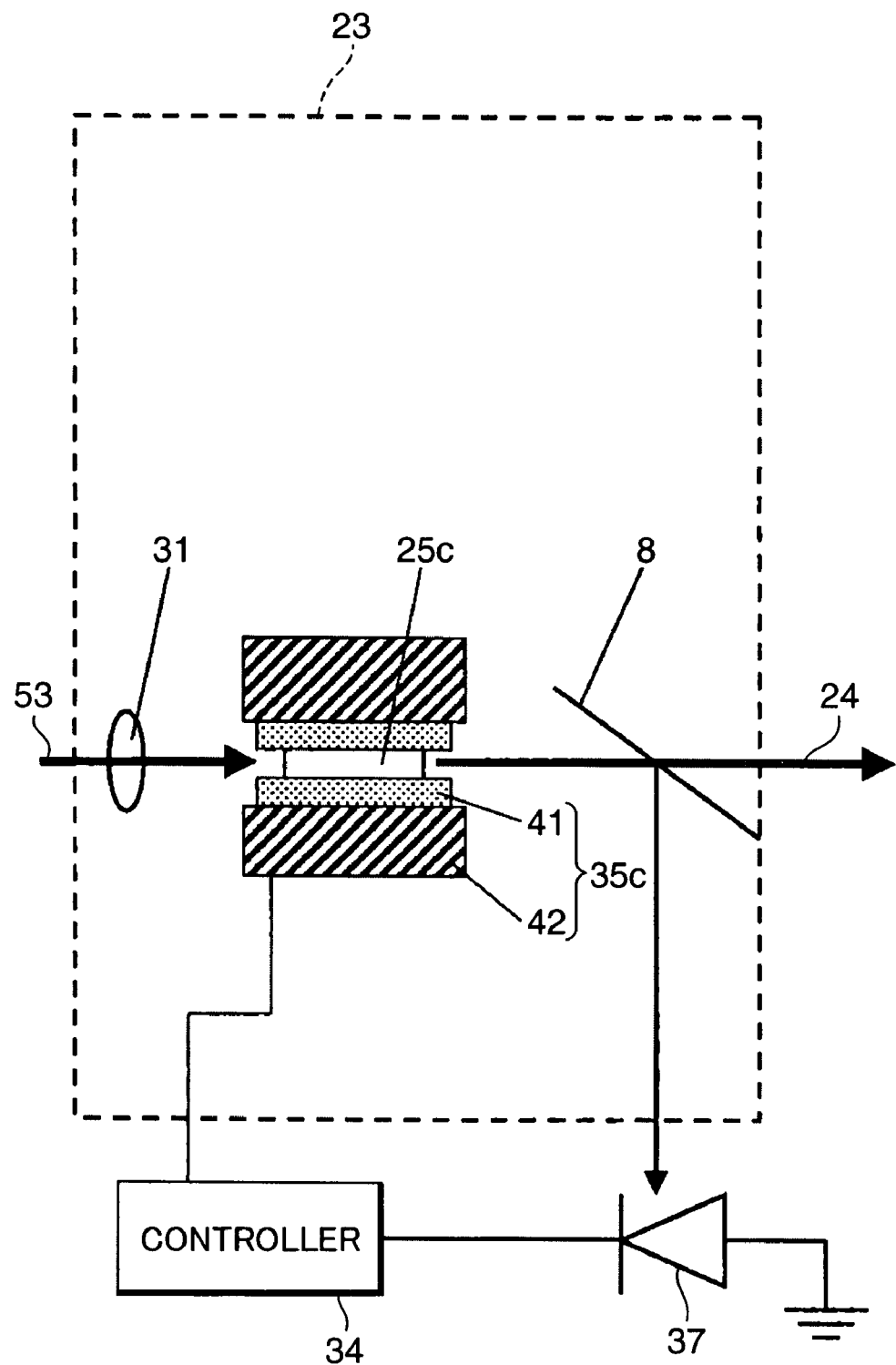
FIG. 7 is a schematic diagram showing still another construction of the wavelength converter.

FIG. 7 shows a construction of the wavelength converter 23 in the case of using a nonlinear crystal using the temperature phase matching as the wavelength conversion element 25. In FIG. 7, the wavelength converter 23 includes a wavelength conversion element 25c, the condenser lens 31, the beam splitter 8 and a wavelength conversion element holder 35c. The wavelength conversion element 25c is formed by the temperature phase matching of the LBO crystal, and the wavelength conversion element holder 35c has a heater 42 for keeping the temperature of the wavelength conversion element 25c and a spacer 41 disposed in a clearance between the corresponding heater 42 and the wavelength conversion element 25c. The heaters 42 are formed by building cartridge heaters in brass blocks, define a space that is 5 mm×5 mm×25 mm (in longitudinal direction) and hold the wavelength conversion element 25c made of the LBO crystal and having dimensions of 3 mm×3 mm×20 mm in this space. The spacers 41 made of aluminum are disposed in the clearances. Here, the phase matching temperature indicates the temperature of a thermocouple for the temperature monitor which is disposed in the brass blocks.

When the oscillation wavelength of the fiber laser 22 was set at 1055 nm, 1060 nm, 1065 nm and 1070 nm and noncritical phase matching conditions (type-I) of the LBO crystal ($\theta$=90°, $\Phi$=0°: on the x-axis) constituting the wavelength conversion element 25c were used, the respective phase matching temperatures were 161° C., 155° C., 147° C. and 136° C. It should be noted that this phase matching temperature varies by about ±2° C. depending on the individual difference of the crystal and the holding condition in the heater 42.

(In the Case of Using the Quasi Phase Matching)

Figure 8:
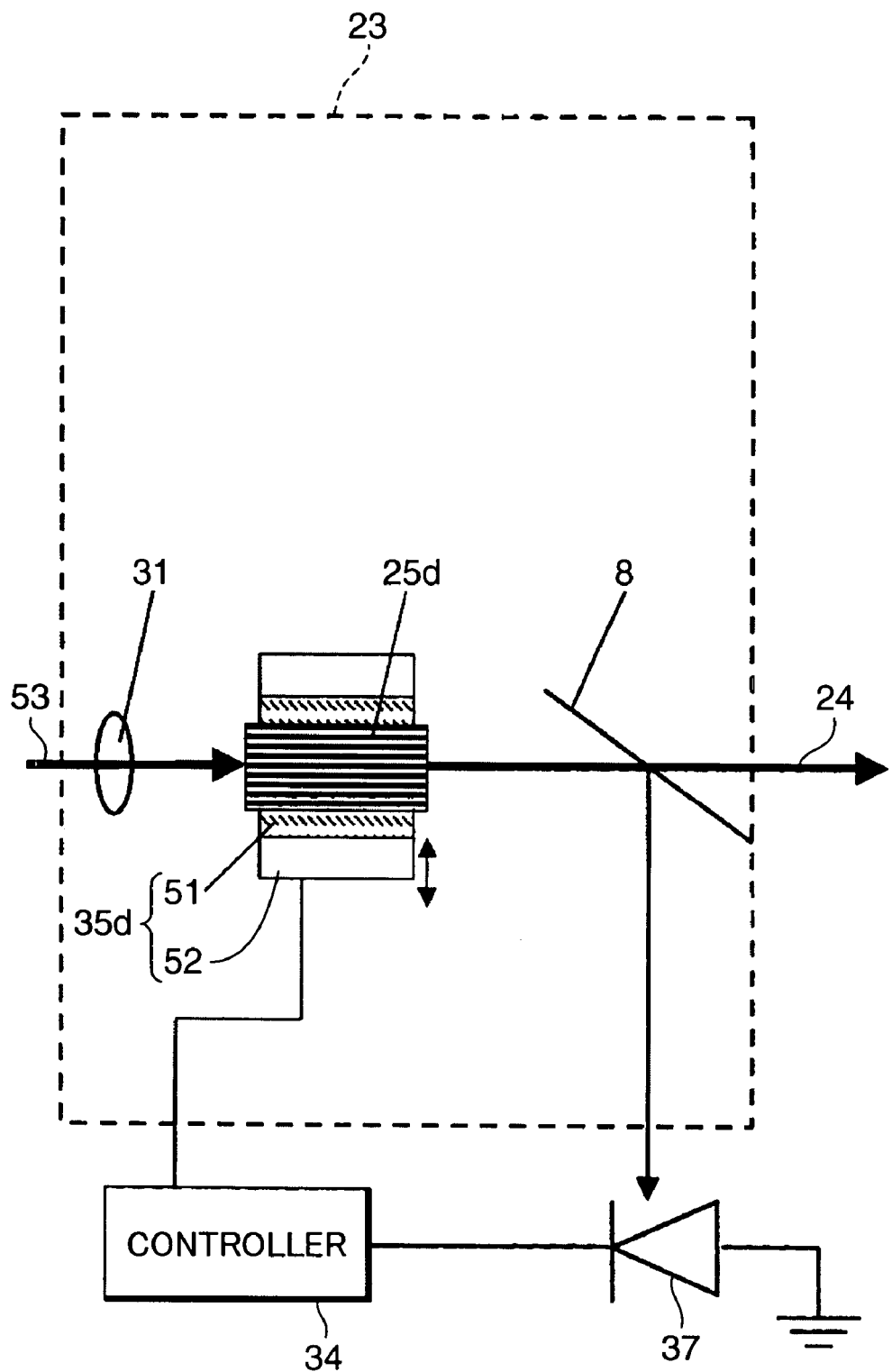
FIG. 8 is a schematic diagram showing further another construction of the wavelength converter.

FIG. 8 shows a construction of the wavelength converter 23 in the case of using a nonlinear crystal using the quasi phase matching as the wavelength conversion element 25. In FIG. 8, the wavelength converter 23 includes a wavelength conversion element 25d, the condenser lens 31, the beam splitter 8 and a wavelength conversion element holder 35d. The wavelength conversion element 25d is formed by the quasi phase matching of a nonlinear optical crystal (MgO: LiNbO₃[MgO: LN]), and the wavelength conversion element holder 35d has a Peltier element for keeping the temperature of the wavelength conversion element 25d, a controller 51 for the Peltier element, and a moving stage 52 for moving the wavelength conversion element 25d in a specified direction. Since a polarization reversal periods are formed in the nonlinear optical crystal (MgO:LN) and a maximum nonlinear optical constant d33 of the MgO:LN crystal can be used, highly efficient wavelength conversion is possible. Since the polarization reversal periods are specified by the wavelength of the fundamental wave 53, the polarization reversal periods formed in the nonlinear optical crystal also need to be switched every time the wavelength of the fundamental wave 53 is switched.

Figure 9A:
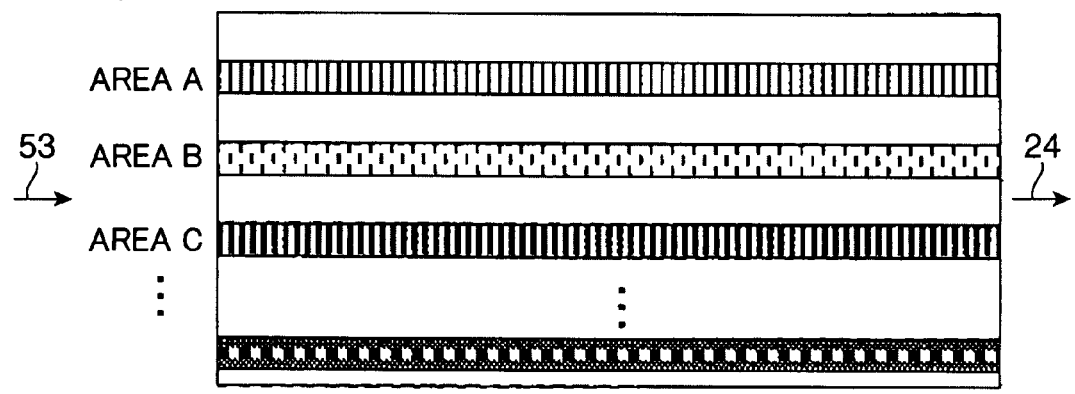
FIG. 9A is a diagram showing one structure of polarization reversal periods of a nonlinear optical crystal constituting a wavelength conversion element.
Figure 9B:
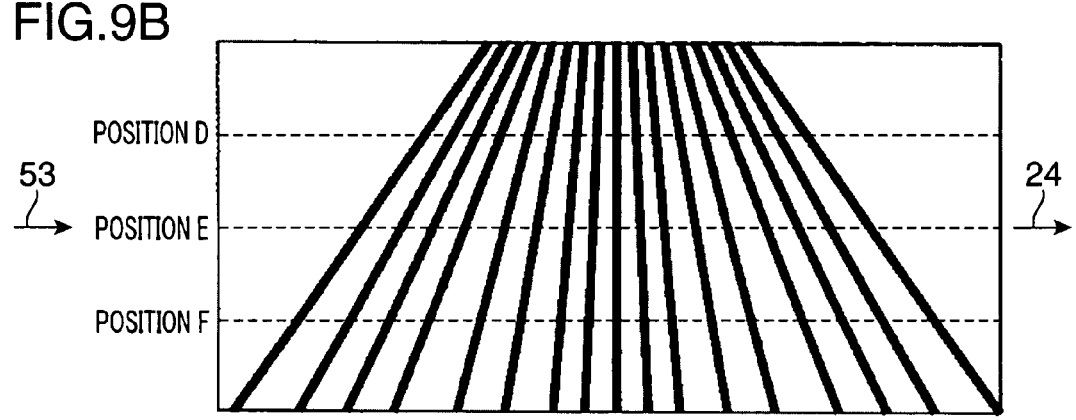
FIG. 9B is a diagram showing another structure of the polarization reversal periods of the nonlinear optical crystal constituting the wavelength conversion element.
Figure 9C:
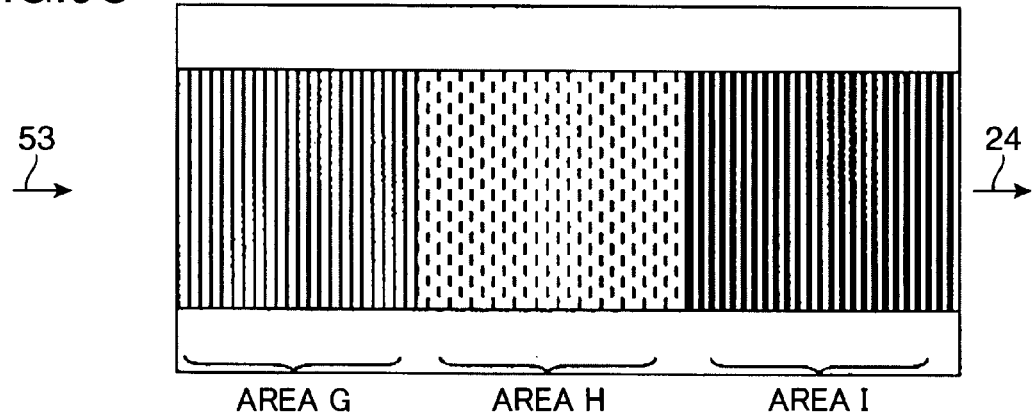
FIG. 9C is a diagram showing still another structure of the polarization reversal periods of the nonlinear optical crystal constituting the wavelength conversion element.

If the oscillation wavelength of the fiber laser 22 is set at 1055 nm, 1060 nm, 1065 nm and 1070 nm, necessary polarization reversal periods are 6.8 μm, 6.9 μm, 7 μm and 7.1 μm. FIGS. 9A to 9C shows the polarization reversal periods formed in the MgO:LN crystal. In FIG. 9A, areas A, B, C, . . . formed with polarization reversal periods are arranged in parallel with a propagation direction of the fundamental wave 53. For example, the polarization reversal period formed in the area A corresponds to the fundamental wave 53 of λ1, the one formed in the area B the fundamental wave 53 of λ2 and the one formed in the area C the fundamental wave 53 of λ3. On the other hand, in FIG. 9B, the polarization reversal periods linearly change. For example, the polarization reversal period at position D corresponds to the fundamental wave 53 of λ1, the one at position E the fundamental wave 53 of λ2 and the one at position F the fundamental wave 53 of λ3.

The wavelength conversion elements 25d having polarization reversal period structures in FIGS. 9A and 9B need to have the area or position, on which the fundamental wave 53 is incident, switched as the wavelength of the fundamental wave 53 is switched. Accordingly, the wavelength conversion element 25d is made movable by the moving stage 52 of the wavelength conversion element holder 35d. Further, a drive timing of the moving stage 52 has to be synchronized with a drive timing of the reflection wavelength varying unit 33 of FIG. 1. To this end, the controller 34 generates a drive signal for driving the moving stage 52 in synchronism with a drive signal for driving the reflection wavelength varying unit 33. In this way, wavelength conversion can be efficiently carried out by accurately switching the area or position of the wavelength conversion element 25c on which the fundamental wave 53 is incident in conformity with the reflection wavelength shift of the second fiber grating 30 by the reflection wavelength varying unit 33. The structure of FIG. 9A can be easily formed if the crystal axis of the MgO:LN crystal is considered.

On the other hand, in FIG. 9C, areas G, H, I, . . . formed with polarization reversal periods are arranged one after another along the propagation direction of the fundamental wave 53. For example, the polarization reversal period formed in the area G corresponds to the fundamental wave 53 of λ1, the one formed in the area H the fundamental wave 53 of λ2 and the one formed in the area I the fundamental wave 53 of λ3. Since the areas of the respective polarization reversal periods are arranged along the propagation direction of the fundamental wave 53 in the structure of FIG. 9C, it is not necessary to move the wavelength conversion element 25d as the wavelength of the fundamental wave 53 is switched. Accordingly, the moving stage 52 of FIG. 8 is not necessary, thereby simplifying the construction of the wavelength conversion element holder 35d and mitigating burdens on the process of the controller 34. The structure of FIG. 9C can be realized by discrete changes of the wavelength of the fundamental wave 53. However, since areas of wavelength conversion (mutual action length) are shorter, the conversion efficiency from the fundamental wave 53 into the harmonic wave 24 decreases. Therefore, the structure of FIG. 9A is preferable in the case of attaching importance to the conversion efficiency.

Next, a method by which the laser light source 21 of FIG. 1 outputs a high-output green laser light (hereinafter, "green light") is described. In FIG. 1, a rare-earth element Yb is doped at a concentration of 1200 ppm as a laser-active substance in a core part of the fiber 26 of the fiber laser 22. A semiconductor laser having a wavelength of 915 nm, a threshold current of 400 mA and a maximum light output of 10 W is used as the excitation laser 28 for the fiber excitation. An excitation light having a wavelength of 915 nm is incident on the fiber 26 and totally absorbed until reaching the second fiber grating 30. As a result, if the excitation light 27 from the excitation laser 28 is incident on the fiber 26, it is absorbed in the core part and an induced emission of a light having a wavelength of about 1050 to 1065 nm occurs from the fiber 26, utilizing the Yb level of the core part. An induced emission light having a wavelength of about 1050 to 1065 nm propagates in the fiber 26 while being amplified with a gain obtained by the absorption of the excitation light 27 and becomes the fundamental wave 53 that is an infrared laser light having a wavelength of about 1050 to 1065 nm. Further, the fundamental wave 53 reciprocates between reflection surfaces while using the first and second fiber gratings 29, 30 as a pair of reflection surfaces of the laser cavity, whereby the oscillation wavelength is selected mainly by the second fiber grating 30 having a lower reflectance. As described above, the reflection wavelength of the second fiber grating 30 at this time is set at 1050 nm, 1055 nm, 1060 nm and 1065 nm and the reflection wavelength bandwidth thereof is set at 0.1 nm. Accordingly, the fundamental wave 53 with a wavelength bandwidth of 0.1 nm is outputted from the fiber laser 22. Although the reflectances of the first and second fiber gratings 29, 30 at the oscillation wavelengths of 1050 nm, 1055 nm, 1060 nm and 1065 nm are respectively set at about 98% and 10%, the reflectances at the respective oscillation wavelengths can be changed by designing since the first and second fiber gratings 29, 30 are both sampled gratings. By setting the reflectance of the first fiber grating 29 at 98% or higher, the oscillation light can be prevented from returning to the excitation laser 28 to break the excitation laser 28. On the other hand, the reflectance of the second fiber grating 30 is preferably about 5 to 20% since it is sufficient to feed back only a light amount to lock a desired oscillation wavelength.

Figure 10:
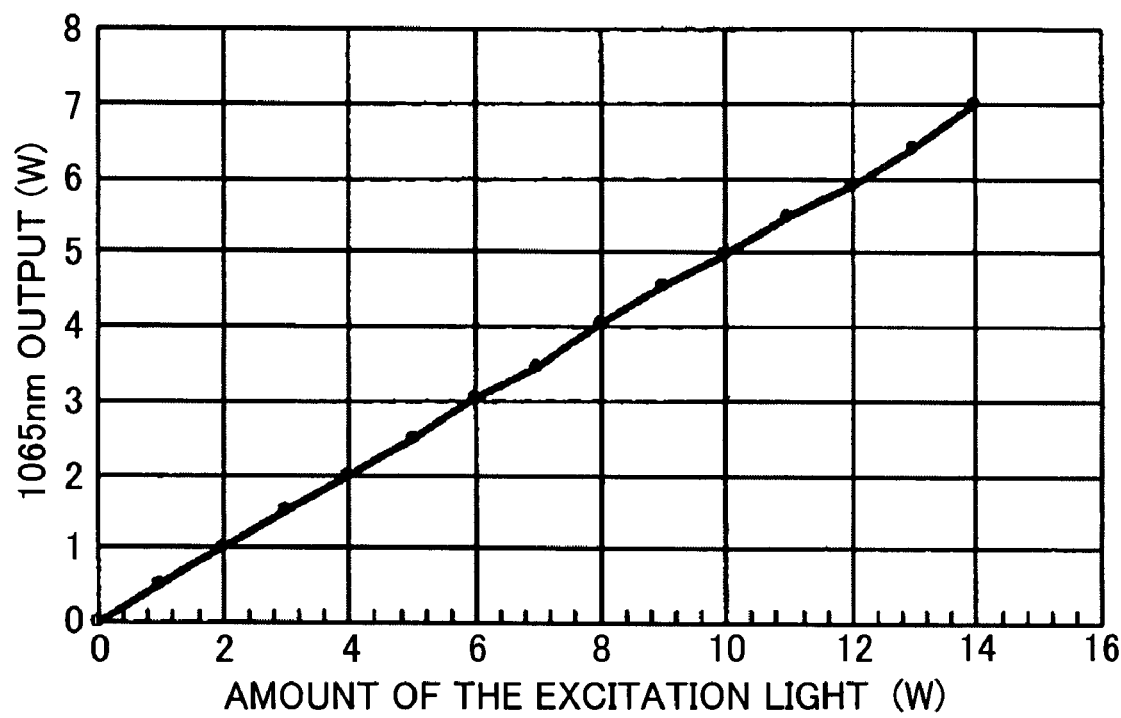
FIG. 10 is a diagram showing an input/output characteristic of a fundamental wave of an excitation laser.

FIG. 10 shows an input/output characteristic of the light output of the fundamental wave 53 with a wavelength of 1065 nm in relation to an amount of the excitation light from the excitation laser 28. It can be understood that the output of the fundamental wave 53 increases with good linearity in proportion to the amount of the excitation light up to 7 W.

Next, the process of converting the fundamental wave 53 emitted from the fiber laser 22 into the harmonic wave 24 by the wavelength conversion element 25 is described. The fundamental wave 53 (e.g. having a wavelength of 1065 nm) outputted from the fiber laser 22 is incident on the wavelength conversion element 25 via the condenser lens 31. The wavelength conversion element 25 is an element for outputting the incident light while converting it into the harmonic wave 24, and MgO:LiNbO₃ crystal having a polarization reversal period structure with a length of 20 mm is, for example, used as such. The case where the MgO:LiNbO₃ crystal having a polarization reversal period structure is used is described below. Here, a wavelength at which the incident light is convertible into a harmonic wave in the wavelength conversion element 25 is called a phase matching wavelength, and is set at 1065 nm at 25° C. in this embodiment. Accordingly, the wavelength 1065 nm of the fundamental wave 53 of the fiber laser 22 coincides with the phase matching wavelength and the fundamental wave 53 is converted, in the wavelength conversion element 25, into the harmonic wave 24, which is outputted from the wavelength converter 23 in the form of a green laser light having a wavelength 532.5 nm that is half the wavelength of the fundamental wave 53.

Generally, the wavelength conversion element 25 is temperature-controlled at an accuracy of 0.01° C. since the phase matching wavelength sensitively changes depending on the temperature of the element. In this embodiment, the wavelength conversion element 25 and the second fiber grating 30 are individually temperature-controlled at an accuracy of 0.01° C. by attaching Peltier elements. With this arrangement, even if the output of the fundamental wave 53 of the fiber laser 22 exceeds 5 W to increase heats generated in the wavelength conversion element 25 and the second fiber grating 30, the harmonic wave 24 in the form of a W-class green laser light can be obtained. It should be noted that temperature sensors are attached to the Peltier elements and the Peltier elements and the temperature sensors are all connected to the controller 34 so that the capture of temperature signal outputs and the driving of the respective components and elements can be controlled.

Accordingly, a fundamental wave having a shorter wavelength can be outputted at a high output equal to or above 5 W by adjusting the kind or amount of a rare-earth element added to the fiber 26 or by adjusting the reflection wavelength of the second fiber grating 30 to a shorter wavelength. Therefore, a W-class green laser light having a shorter wavelength of 526 to 540 nm can be obtained.

The controller 34 may store a table containing data inputted beforehand and temperature-control the second fiber grating 30 and the wavelength conversion element 25 based on this table. By these constructions, the phase matching conditions of the fundamental wave 53 in the wavelength conversion element 25 can be accurately controlled, and the more stable harmonic wave 24 can be efficiently outputted from the wavelength conversion element 25.

The table may contain data on an amount of change of the phase matching wavelength in the wavelength conversion element 25 in relation to the output of the fundamental wave 53. Alternatively, the table may contain data on an amount of change of the reflection wavelength in the second fiber grating 30 in relation to the output of the fundamental wave 53. By these constructions, the phase matching conditions in the wavelength conversion element 25 in relation to the output and wavelength of the fundamental wave 53 can be quickly adjusted by the temperature controls of the second fiber grating 30 and the wavelength conversion element 25 when the output of the fundamental wave 53 changes, whereby the output of the harmonic wave from the wavelength conversion element 25 can be more stably maintained.

A green laser light having a shorter wavelength of 526 to 540 nm can be obtained and the range of reproduced colors can be more expanded than the conventional sRGB specification by shortening the length of the fiber 26 of the fiber laser 22. Therefore, a color reproduction range can be further expanded upon the application to a display or the like.

Second Embodiment

Figure 11:
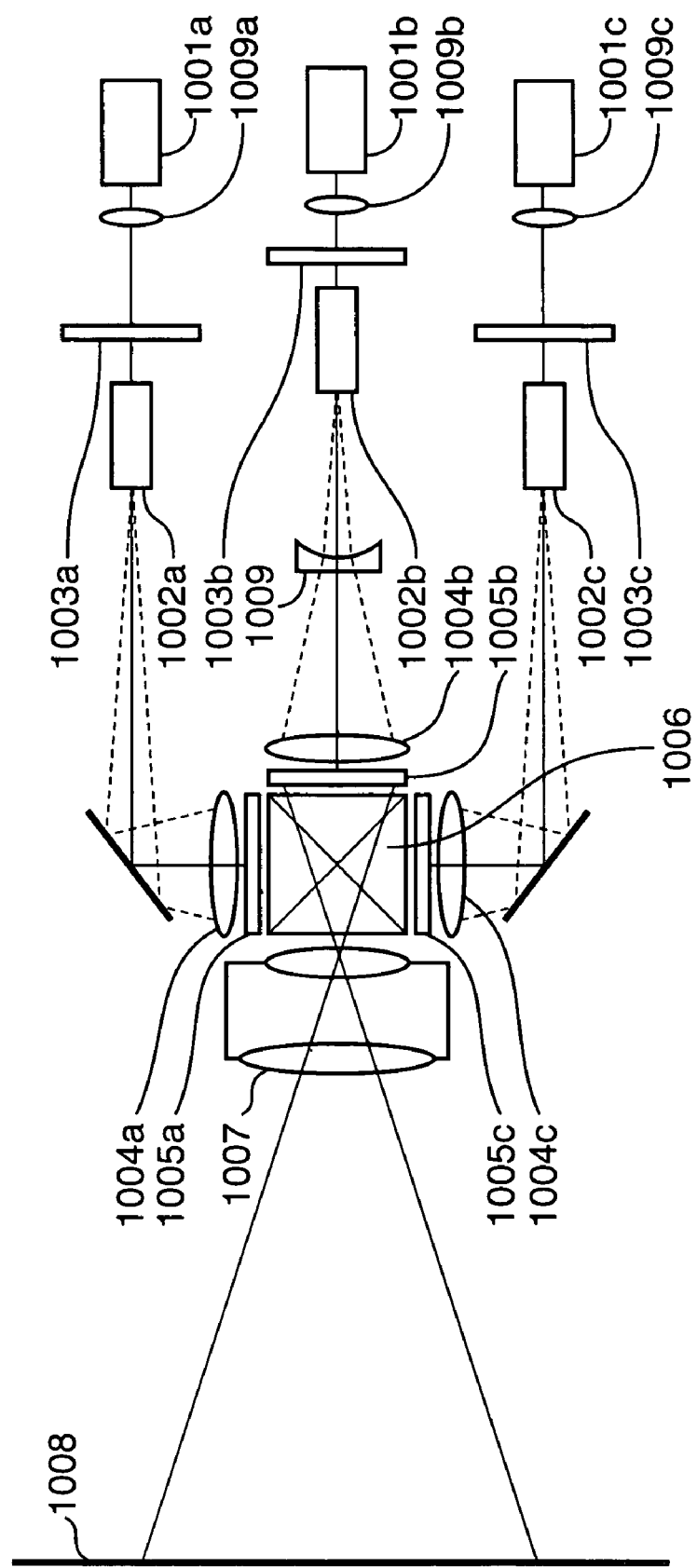
FIG. 11 is a diagram showing a schematic construction of a two-dimensional image display device according to a second embodiment of the invention.

Next, a second embodiment of the present invention is described. FIG. 11 shows a construction of a laser display (two-dimensional image display device) according to the second embodiment of the present invention. The laser display according to this embodiment is an example of a laser display to which the laser light source according to the first embodiment is applied.

Three color laser light sources 1001*a* to 1001*c* of red (R), green (G) and blue (B) are used as light sources. An AlGaInP/GaAs semiconductor laser having a wavelength of 638 nm is used as the red laser light source (R light source) 1001*a* and a GaN semiconductor laser having a wavelength of 465 nm is used as the blue laser light source (B light source) 1001*c*.

On the other hand, the laser light source according to the first embodiment is used as the green laser light source (G light source) 1001*b*. This is a laser light source including the wavelength conversion element for halving the wavelength of the infrared laser light. Laser beams emitted from the respective R, G, B light sources 1001*a* to 1001*c* are caused to scan diffusers 1003*a* to 1003*c* by reflection-type two-dimensional beam scanning means 1002*a* to 1002*c* after being condensed by condenser lenses 1009*a* to 1009*c*. An image data is divided into R, G and B data, and a color image is formed by multiplexing signals of these data by means of a dichroic prism 1006 after being focused by field lenses 1004*a* to 1004*c* and inputted to spatial light modulation elements 1005*a* to 1005*c*. The image multiplexed in this way is projected onto a screen 1008 by a projection lens 1007. A concave lens 1009 for equalizing the spot size of the green light to those of the R light and B light in the spatial light modulation element 1005*b* is inserted in a light path from the G light source 1001*b* to the spatial light modulation element 1005*b*.

Although each of the R light source and B light source is constructed by one semiconductor laser in this embodiment, it may be constructed such that outputs of a plurality of semiconductor lasers can be obtained as one output, for example, by grouping bundle fibers together. With such an arrangement, the widths of the wavelength spectra of the R light source and B light source can be increased, whereby coherency can be mitigated to suppress speckle noises of the light sources. Similarly for the G light source, G light outputs of a plurality of semiconductor lasers may be respectively guided by output fibers, and these output fibers may be grouped together into one fiber, for example, by using bundle fibers so as to suppress speckle noise.

In the laser display of FIG. 11, members such as vibration diffusers 1003*a* to 1003*c* and the field lenses 1004*a* to 1004*c* are disposed before the spatial light modulation elements 1005*a* to 1005*c*. These members are disposed to remove speckle noises generated by the use of laser beams having strong coherency as light sources. By swinging these speckle noise removing means, speckle noise seen during a response time of human eyes can be reduced.

In this embodiment, a fundamental wave emitted from a fiber laser is incident on a wavelength conversion element to generate a harmonic wave by using the laser light source of the first embodiment as the G light source 1001*b*. The construction of the laser display according to this embodiment is characterized by the laser light source used as the G light source 1001*b*.

The laser display of this embodiment can have a high luminance and a thin configuration since the laser light sources are used as the R, G and B light sources. Further, the color reproduction range can be more expanded, for example, to 523 nm than the conventional sRGB specification and color representation approximate to original colors is possible by using the laser light source according to the first embodiment as the G light source 1001*b*. In other words, the laser display of this embodiment can expand the color reproduction range more than conventional laser displays.

Further, the G light source 1001b can arbitrarily oscillate any of lights, for example, having wavelengths of 525 nm, 527.5 nm, 530 nm and 532.5 nm. Thus, speckle noise can be reduced to 20% or lower as compared to the case of a single wavelength. Further, by swinging the vibration diffuser 1003b, a brightness difference caused by the speckle noise can be reduced to such an extent (2% or lower) that the speckle noise cannot be sensed by human eyes.

This embodiment can have such a mode for projecting a light from behind the screen (rear projection display) besides the two-dimensional image display device having such a construction. Further, this embodiment can also be used as a backlight of a liquid crystal panel by evening out the laser lights by means of light guide plates.

Third Embodiment

Figure 12:
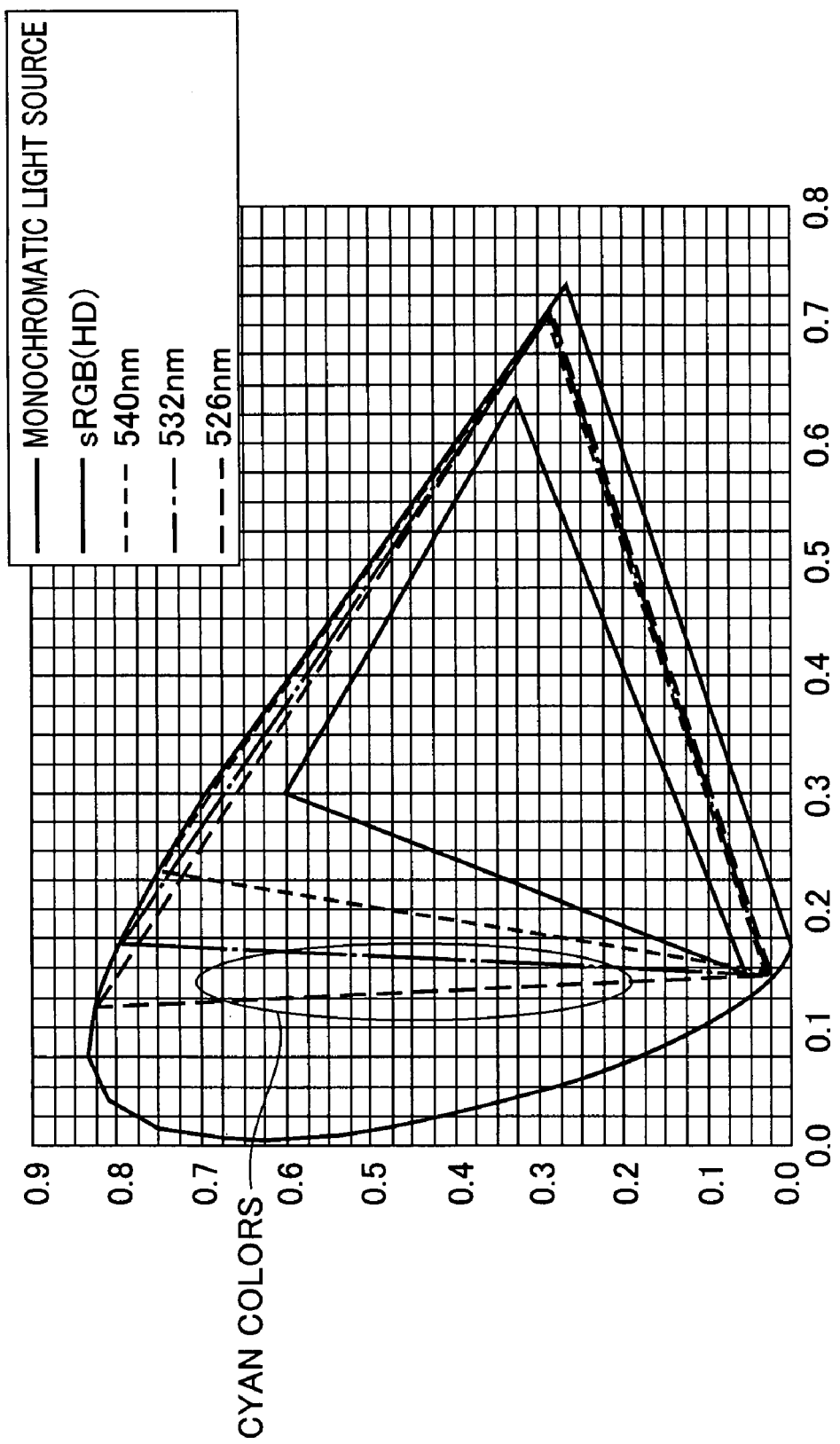
FIG. 12 is a chromaticity diagram showing a relationship of the wavelength and color reproduction range of a green light.

Next, a third embodiment of the present invention is described. Generally, it is known that the color reproduction range of a video changes as the oscillation wavelength of a green light changes. FIG. 12 shows a relationship between the wavelength of a green light and the color reproduction range. Since a luminosity factor is high at a wavelength of 532.5 nm, a small power is sufficient to obtain the same luminance, but there is a problem of being unable to reproduce "cyan" colors necessary to display the color of the sea and the like. On the other hand, the "cyan" colors can be reproduced at a wavelength of 525 nm, but there is a problem of necessitating more than twice the power as compared to the case of 532.5 nm since a luminosity factor is low.

In order to solve such problems, a laser light source according to this embodiment enables more bright videos to be displayed with the same power consumption utilizing the luminosity factor of human eyes by switching the oscillation wavelength of a laser light depending on the type of the video and a status of use. A case where the laser light source according to this embodiment is used as a green light source of a laser display is described below.

Figure 13:
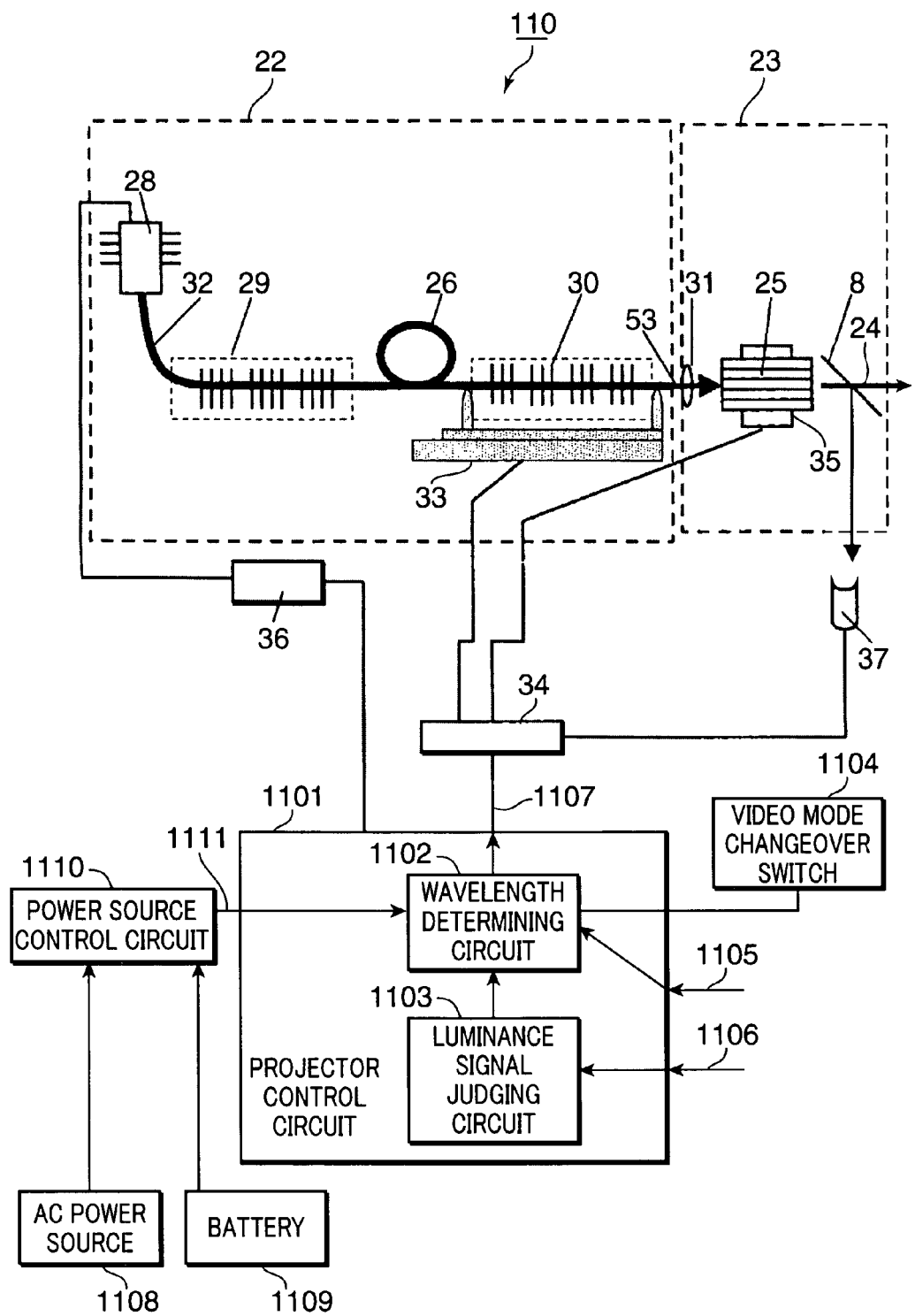
FIG. 13 is a diagram showing a schematic construction of a laser light source according to a third embodiment of the invention.

FIG. 13 shows a schematic construction of the laser light source according to this embodiment. A laser light source 110 according to this embodiment is constructed by adding a projector control circuit 1101 including a wavelength determining circuit 1102 and a luminance signal judging circuit 1103, and a video mode changeover switch 1104 to the laser light source according to the first embodiment. Further, a video signal (data) 1105 or a video signal (video) 1106 is externally inputted to the projector control circuit 1101, which in turn sends a wavelength selection signal 1107 to a controller 34 to select the oscillation wavelength of the laser light.

The operation of the projector control circuit 1101 is described. Normally, a laser display includes a plurality of terminals for the input and output of video signals such as D-sub15pin, DVI, RCA pin, S-terminal, D-terminal and HDMI. Accordingly, there is first described the case where the projector control circuit 1101 changes the oscillation wavelength of the laser light by detecting to which one of the terminals of the laser display a video signal has been inputted.

It is, for example, assumed that the video signal (data) 1105 has been inputted to the laser display. If the video signal (data) 1105 has been inputted through the D-sub15pin or DVI, this video signal 1105 can be said to be a data signal in which importance is attached to brightness such as the one used for presentation. In this case, the wavelength determining circuit 1102 sends the wavelength selection signal 1107 to the controller 34 to select a green light having a wavelength with a high luminosity factor.

If the video signal has been inputted through the RCA pin, S-terminal, D-terminal, HDMI or the like, this video signal is often the video signal (video) 1106. In this case, the luminance signal judging circuit 1103 judges the brightness of a video source. The luminance signal judging circuit 1103 analyzes a luminance signal in the video to discriminate whether the inputted video signal 1106 is a video signal in which much importance is not attached to color because of a bright scene such as general television programs (e.g. programs shot in studios) or a video signal requiring a wide color reproduction range although there are many dark scenes as in a movie. In the former case, the rate of using green wavelengths with a high luminosity factor can be increased to improve efficiency. In the latter case, the rate of increasing shorter green wavelengths such as 526 nm capable of expanding the color reproduction range can be increased to improve image quality.

Further, a user can arbitrarily determine which wavelength to be used by means of the video mode changeover switch 1104. For example, a green wavelength having a high luminosity factor can be designated if the user prefers bright videos, whereas a wavelength capable of expanding the color reproduction range can be designated if the user constantly wants to see high quality videos having a wide color reproduction range. The oscillation wavelength can also be determined in the wavelength selection signal 1107 determined by the luminance signal judging circuit 1103.

Since the laser light source 110 according to this embodiment can oscillate at any desired one of the wavelengths 525 nm, 527.5 nm, 530 nm and 532.5 nm, brightness sensed by human eyes can be improved with the same power consumption by emitting a light having a wavelength of 532.5 nm with a high luminosity factor if the laser light source 110 is used in a data projector requiring more brightness than color reproducibility. On the other hand, in the case of requiring more color reproducibility than brightness as in a movie, color reproducibility can be improved by emitting a light having a wavelength of 525 nm capable of expanding the color reproduction range although having a low luminosity factor.

The method for changing an emission ratio is not limited to the aforementioned one, and similar effects can be obtained even if another method is applied.

In this embodiment, in the case of using a battery 1109 as a power source, the life of the battery 1109 can be improved by using either one of an AC power source 1108 or the battery 1109 or by switching the oscillation wavelength depending on the remaining amount of the battery 1109. For example, in the case of judging which of the AC power source 1108 and the battery 1109 is being used, a power source control circuit 1110 judges the type of the power source and sends a power source judgment signal 1111 to the wavelength determining circuit 1102, which in turn determines the wavelength. By determining the oscillation wavelength through the judgment on the remaining amount of the battery 1109 by the power source control circuit 1110, a bright image can be displayed with less power consumption by projecting a green light having a higher efficiency as the fiber laser 22 and a longer wavelength with a high luminosity factor if the battery 1109 is used or the remaining battery amount is small.

Fourth Embodiment

Figure 14:
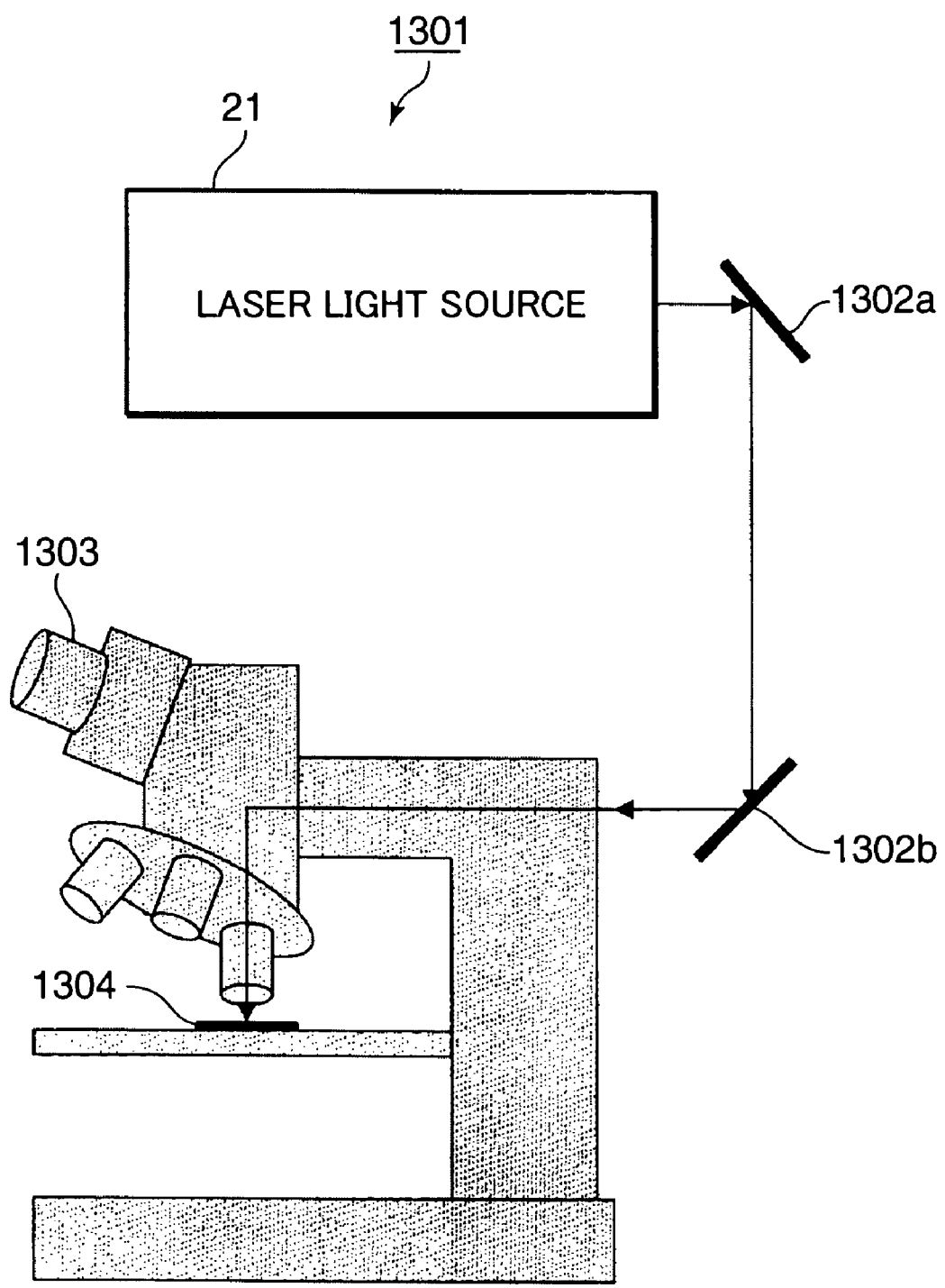
FIG. 14 is a diagram showing a schematic construction of a laser fluorescence microscope according to a fourth embodiment of the invention.

Next, a fourth embodiment of the present invention is described. FIG. 14 shows a construction of a laser fluorescence microscope according to the fourth embodiment of the present invention. The laser fluorescence microscope according to this embodiment uses the laser light source according to the first embodiment, and observes a fluorescent part by dying a sample with a fluorescent substance such as rhodamine and exciting the dyed sample with a light emitted from the laser light source according to the first embodiment. There are several kinds of fluorescent substances, and the wavelengths of corresponding excitation lights differ. For example, the excitation wavelength of a fluorescent reagent called TRITC is 540 nm, and that of a reagent called TexasRed is 560 nm. Besides, fluorescent reagents having various excitation wavelengths are commercially available. Since parts remaining in cells differ among various reagents, visibility can be largely improved.

A laser light emitted from a laser light source 21 of a laser fluorescence microscope 1301 according to this embodiment is reflected by mirrors 1302a, 1302b to be introduced into a microscope 1303. By irradiating a sample 1304 with the laser light, a fluorescent substance held in the sample 1304 is excited, thereby enabling a fluorescent part to be confirmed in the form of an image. Conventionally, a light source that splits a light of a halogen lamp by means of a dichroic mirror and a light source using a dye laser have been used, but the light source using the halogen lamp has had a problem of exciting dyes desired not be excited due to incapability of complete color separation. The light source using the dye laser has had a problem of requiring dyes of a liquid to be frequently exchanged and requiring a large number of maintenances although the complete color separation is possible because of being a tunable laser. This embodiment is free from maintenance and has a remarkably smaller size than the dye laser although the wavelength is discretely changed.

As described above, according to the first to fourth embodiments, the oscillation wavelength of the laser can be discretely changed by making the fiber grating periods at a narrower band side of a pair of fiber gratings having a plurality of reflection wavelengths variable. Thus, there can be realized a high-output laser light source device that can be used while switching a plurality of wavelengths. Further, since the wavelength at which light is desired to be oscillated can be arbitrarily selected by conforming the reflectance at the narrower band side and the gain of the laser medium to each other, a W-class visible laser light can be more stably outputted and a green laser light having a higher luminosity factor can be emitted as compared to the case of simultaneous oscillation at a plurality of wavelengths. There can be also realized a two-dimensional image display device having a high luminance, a wide color reproduction range, a high image quality and a low power consumption.

Figure 15A:
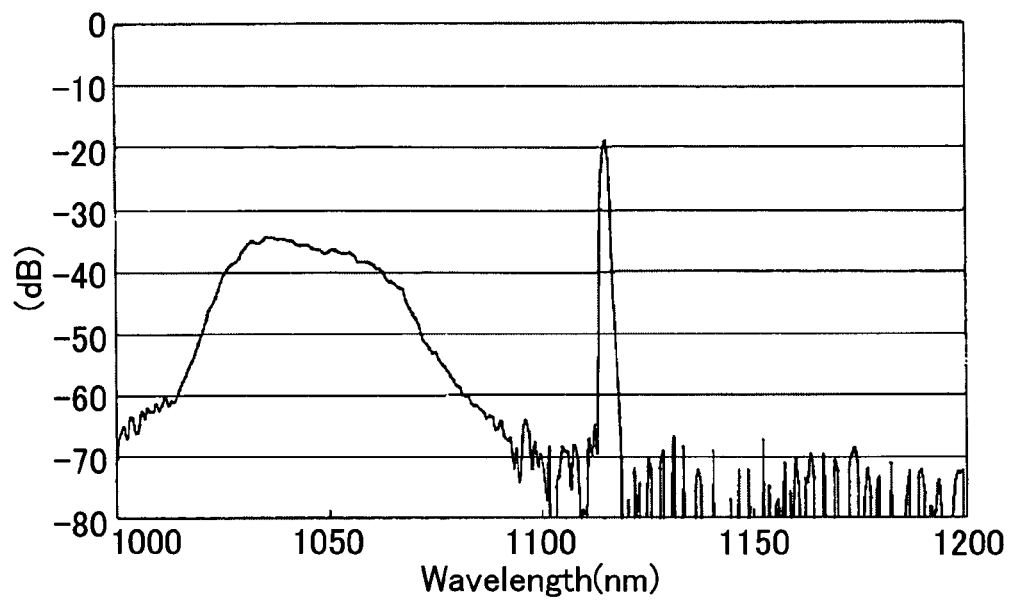
FIG. 15A is a graph showing an oscillation spectrum of a fiber laser at the time of generating an ASE.
Figure 15B:
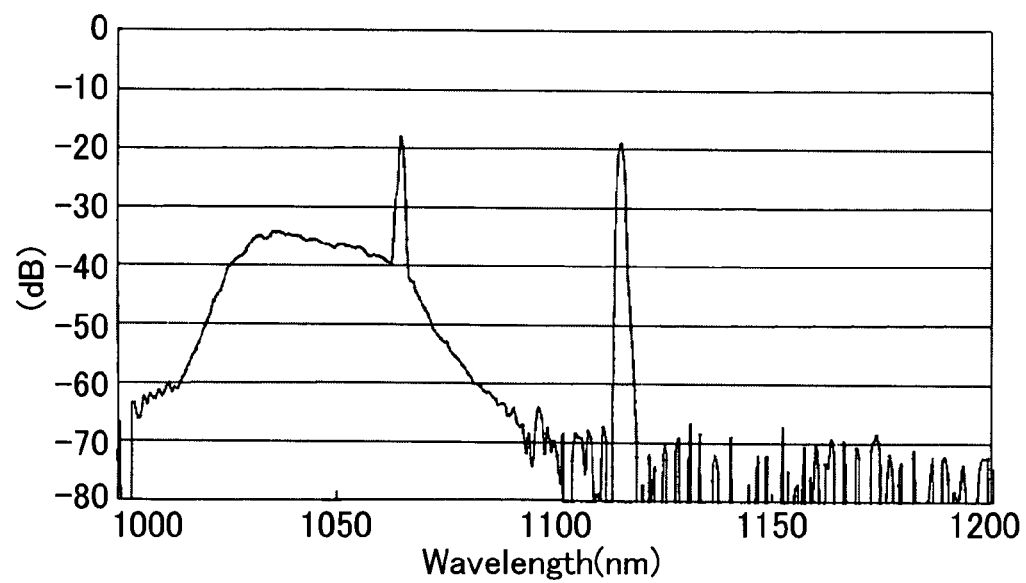
FIG. 15B is a graph showing an oscillation spectrum of the fiber laser at the time of devising a countermeasure against the ASE.

In the above first to fourth embodiments, amplified spontaneous emission occurs in a wavelength range of 1000 to 1100 nm in the fiber laser to break the excitation laser in the case of obtaining a harmonic wave by oscillating a light having a wavelength equal to or longer than 1100 nm such as 1120 nm as shown in FIG. 15A. Accordingly, the breakage of the excitation laser can be prevented and a stable output can be obtained by designing the fiber gratings so as to simultaneously oscillate at any wavelengths in the wavelength range of 1000 to 1100 nm as shown in FIG. 15B.

Further, although the fiber laser doped with Yb as a rare-earth element is used in the above first to fourth embodiments, at least one rare-earth element selected from other rare-earth elements such as Nd and Er may be used. It is also possible to change a doped amount of the rare-earth element and to dope a plurality of rare-earth elements depending on the wavelength and output of the wavelength conversion element.

Although the laser having wavelengths of 915 nm and 976 nm is used as the excitation laser of the fiber laser in the above first to fourth embodiments, any laser having other wavelengths may be used provided that it can excite the fiber laser.

Since the laser light source and the two-dimensional image display device according to the first to fourth embodiments have a high luminance, a wide color reproduction range and a low power consumption, they are useful for analytical application in the display field such as large-scale displays and high-luminance displays and in the biochemical field.

Fifth Embodiment

Next, a fifth embodiment of the present invention is described. This embodiment relates to a medical laser light source device used for surgery, which device uses a laser light source capable of outputting a stable visible high-output laser light.

Figure 16:
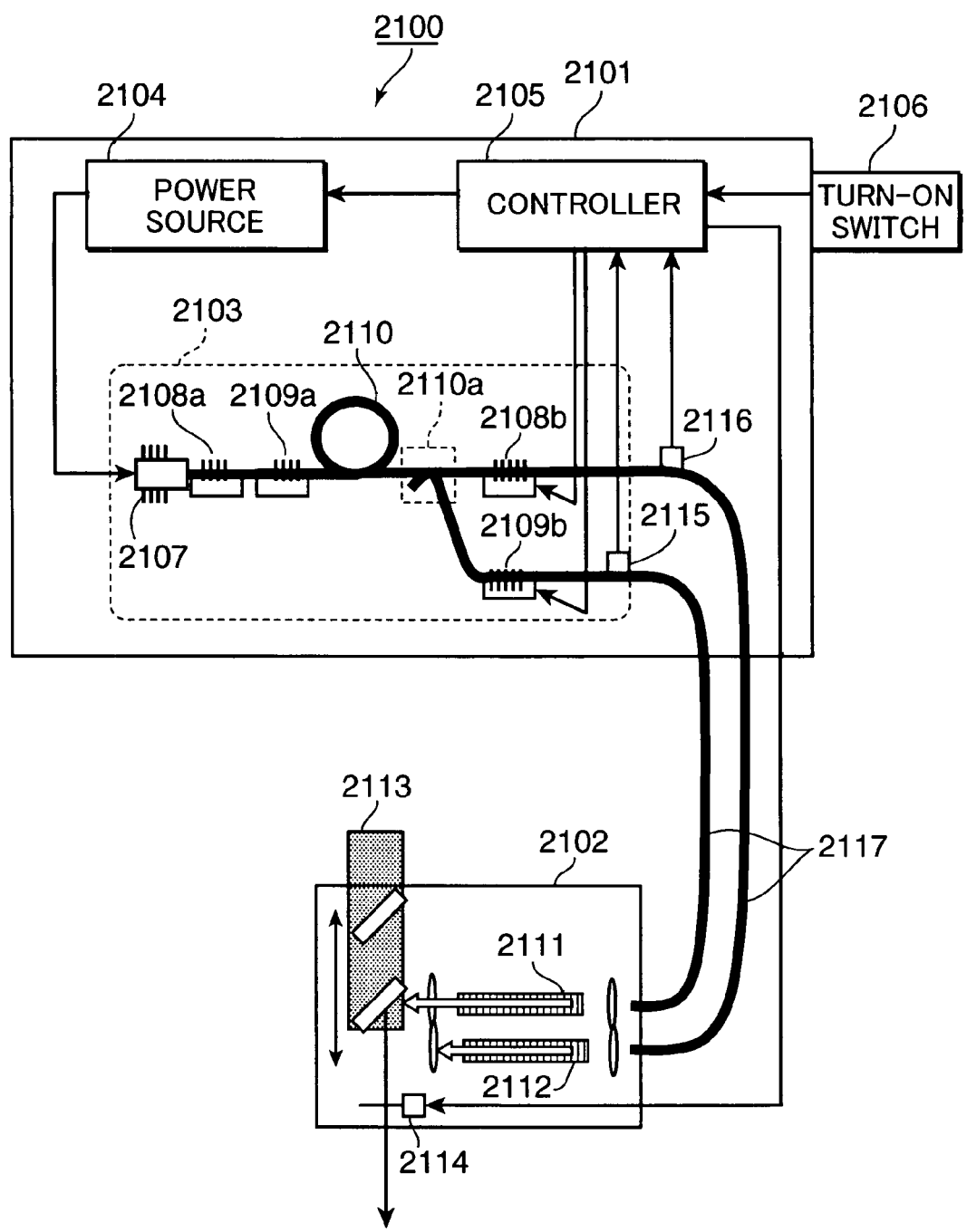
FIG. 16 is a diagram showing a schematic construction of a laser light source device according to a fifth embodiment of the invention.

FIG. 16 is a diagram showing a schematic construction of a laser light source device according to this embodiment. A laser light source device 2100 according to this embodiment is provided with a laser oscillator 2101 and a laser light irradiator 2102. The laser oscillator 2101 includes a fiber laser 2103, a power source 2104, a controller 2105, whereas the laser light irradiator 2102 includes two wavelength conversion elements 2111 and 2112 and a light selector 2113. The laser oscillator 2101 also includes a turn-on switch 2106 with which a user can determine an emission timing of a laser light. The laser light emitted from the fiber laser 2103 is transmitted to the laser light irradiator 2102 via fibers 2117.

The fiber laser 2103 includes a fiber 2110 doped with a rare earth such as Yb, an excitation laser 2107 for outputting an excitation light to be incident on the fiber 2110, fiber gratings 2108a, 2108b, 2109a and 2109b capable of selecting the wavelength of a fundamental wave, and a PANDA coupler 2110a, wherein the fiber gratings 2108a and 2109a and the fiber 2110 are formed by double-clad polarization maintaining fibers.

The laser light irradiator 2102 feeds parts of the generated visible light back to the laser oscillator 2101 via the fibers 2117. In the laser oscillator 2101, the visible lights fed back via the fibers 2117 are monitored by photodiodes 2115, 2116. A controller 2105 stabilizes an output of the excitation laser 2107 by controlling the power source 2104 for driving the excitation laser 2107 based on a monitoring result. The fibers 2117 are preferably double-clad polarization maintaining fibers in order to reduce a coupling loss of the visible light from the laser light irradiator 2102 to the fibers 2117 and a propagation loss of the visible light by the fibers 2117. Further, leak lights are generated at connection points of the fiber gratings 2108b, 2109b with the fibers 2117 by forming the fiber gratings 2108b, 2109b of ordinary polarization maintaining fibers. Thus, visible lights for monitoring can be obtained for the photodiodes 2115, 2116.

Next, the operation of the fiber laser 2103 is described. An excitation light from the excitation laser 2107 is incident on the fiber 2110. The incident excitation light propagates in the fiber 2110 while being absorbed by a laser-active substance contained in the fiber 2110. A seed light of the fundamental wave is generated in the fiber 2110 in a state where gains for amplifying the fundamental wave in the fiber 2110 are uniformly increased through the passage and absorption of the excitation light in the fiber 2110. This seed light of the fundamental wave reciprocates by being reflected in these cavities while increasing the intensity by being amplified and consequently reaches laser oscillation, using the fiber gratings 2108a, 2108b as one cavity or using the fiber gratings 2109a, 2109b as one cavity.

The PANDA coupler 2110a is used to change the oscillation wavelength in each polarization direction of the fundamental wave. For example, by fusion bonding the fiber grating 2109b having a reflection wavelength of 1063 nm and a reflection band of 0.05 nm in a slow-axis direction of the PANDA coupler 2110a and fusion bonding the fiber grating 2108b having a reflection wavelength of 1178 nm and a reflection band of 0.05 nm in a fast-axis direction of the PANDA coupler 2110a, oscillation occurs at 1064 nm in the slow-axis direction and at 1178 nm in the fast-axis direction in the Yb fiber 2110. Similar effects can be obtained even if the fast and slow-axis directions of the respective wavelengths are switched provided that polarization directions at the respective wavelengths are orthogonal to each other.

By changing the oscillation wavelength in each polarization direction of the fundamental wave in this way, an output instability caused by intermode competition occurring at the time of multiwavelength oscillation can be prevented. In the case of generating a light of 1178 nm, an ASE (amplitude spontaneous emission) light having a wavelength of 1040 to 1090 nm is generated. This results in not only a reduced efficiency in light generation at 1178 nm, but also an inadvertent occurrence of pulse oscillation to break the fiber laser cavity. Thus, it is caused to simultaneously oscillate at 1064 nm at the time of generating the light having a wavelength of 1178 nm. By doing so, inadvertent pulse oscillation is suppressed to prevent the breakage of the fiber laser cavity. At this time, if a desired wavelength is 589 nm that is the wavelength of a harmonic wave of the fundamental wave having a wavelength of 1178 nm, a Q-value of the cavity generating the light having a wavelength of 1064 nm is decreased by changing the reflection wavelength of the fiber grating 2109b through the control of the temperature of the fiber grating 2109b or a tensile stress to the fiber grating 2109b for generating the light having a wavelength of 1064 nm. In this way, the energy of the excitation light is more used for the generation of the light having a wavelength of 1178 nm by the fiber grating 2108b.

As described above, it is essential that the fiber gratings 2108a, 2109a and the fiber 2110 are double-clad polarization maintaining fibers. On the other hand, the PANDA coupler 2110a, the fiber gratings 2108b and 2109b are preferably ordinary polarization maintaining fibers having no double-clad structure. The tail ends of the polarization maintaining fibers formed with the fiber gratings 2108b and 2109b, i.e. exits for the fundamental wave are connected by fusion bonding with the fibers 2117 for transmitting the fundamental wave laser light to the laser light irradiator 2102. The photodiodes 2115, 2116 for monitoring return lights of visible lights generated in the wavelength conversion elements 2111, 2112 arranged in the laser light irradiator 2102 are deposed near the connection points. Since infrared lights also leak at the connection points, infrared filters are preferably mounted on the photodiodes 2115, 2116. In this embodiment, dielectric multilayer films for returning only 8% of the visible light generated by the wavelength conversion in an incident direction are formed on the light emission surfaces of the wavelength conversion elements 2111, 2112. The visible lights reflected in the incident direction are coupled to the fibers 2117 again. At this time, since the fibers 2117 are double-clad fibers, the coupling efficiency of the visible lights to the fibers 2117 is improved and more visible lights can be transmitted to the above connection points. As a result, the photodiodes 2115, 2116 can more accurately monitor the above visible lights. Reflected amounts of the visible lights by the respective light emission surfaces of the wavelength conversion elements 2111, 2112 depend on the lengths of the fibers 2117 and preferably lie in a range of 1 to 10%.

The laser light source device 2100 according to this embodiment controls the phase matching conditions of the wavelength conversion elements 2111, 2112 by changing the oscillation wavelength of the fiber laser 2103. This control of the phase matching conditions is described below.

In FIG. 16, the visible lights reflected by the light emission surfaces of the wavelength conversion elements 2111, 2112 of the laser light irradiator 2102 are transmitted to the laser oscillator 2101 via the fibers 2117 to be monitored by the photodiodes 2115, 2116 as described above. The controller 2105 obtains the output intensities of the respective visible lights from the wavelength conversion elements 2111, 2112 based on the monitoring results of the photodiodes 2115, 2116. The controller 2105 changes the oscillation wavelength of the fiber laser 2103 by shifting the reflection wavelengths of the fiber gratings 2108b, 2109b based on the output intensities of the respective visible lights from the wavelength conversion elements 2111, 2112. The phase matching conditions of the wavelength conversion elements 2111, 2112 are controlled by changing the oscillation wavelength of the fiber laser 2103.

The setting of the shift amounts of the reflection wavelengths of the fiber gratings 2108b, 2109b is realized, for example, through a temperature control by Peltier elements. The controller 2105 changes the oscillation wavelength of the fiber laser 2103 through the temperature control of the fiber gratings 2108b, 2109b to bring the phase matching conditions of the wavelength conversion elements 2111, 2112 into coincidence again if the output intensities vary due to the variance of the phase matching conditions of the wavelength conversion elements 2111, 2112. It should be noted that the shift amounts of the reflection wavelengths of the fiber gratings 2108b, 2109b may also be controlled by applying tensile stresses to the fiber gratings 2108b, 2109b as in the first embodiment.

Figure 17A:
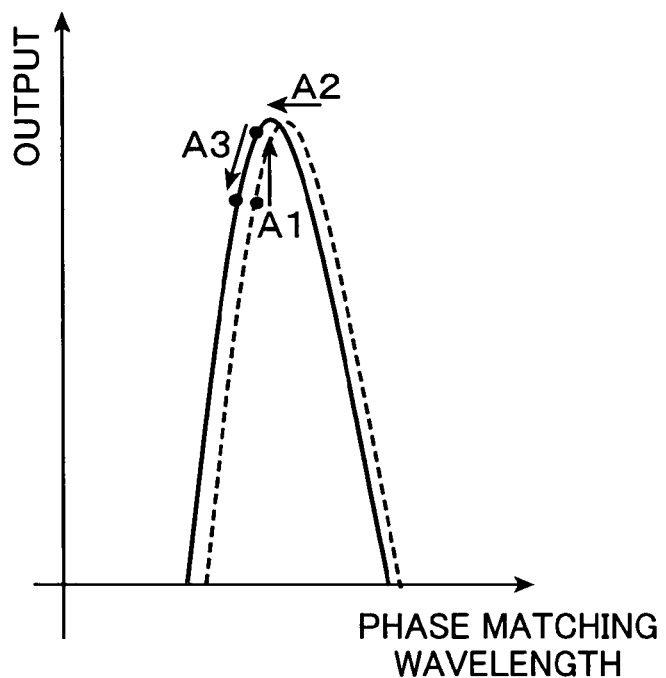
FIG. 17A is a graph showing a change of a characteristic curve of a phase matching wavelength of a wavelength conversion element.
Figure 17B:
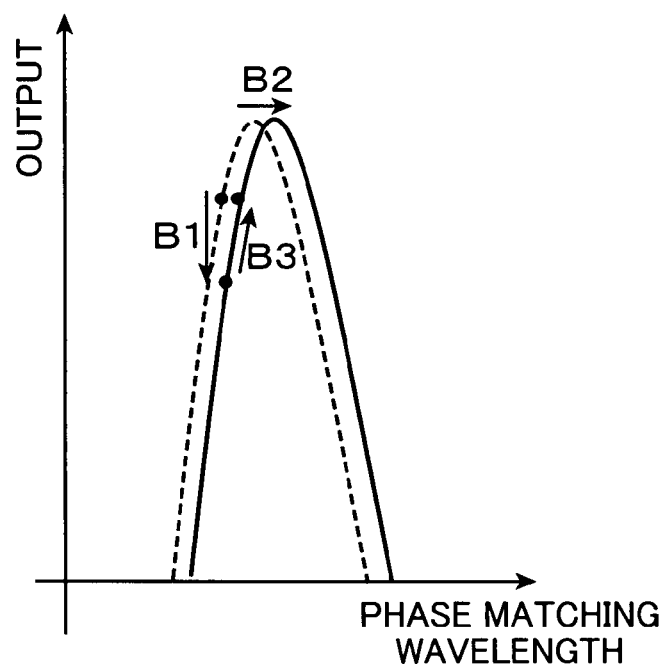
FIG. 17B is a graph showing another change of the characteristic curve of the phase matching wavelength of the wavelength conversion element.

Next, the temperature control of the fiber gratings 2108b, 2109b by the controller 2105 is specifically described. Since the same temperature control is carried out for both the fiber gratings 2108b and 2109b, the case of temperature controlling the fiber grating 2108b is described below. FIG. 17A is a graph showing a change of a phase matching wavelength when the temperature of the wavelength conversion element 2112 decreased, and FIG. 17B is a graph showing a change of the phase matching wavelength when the temperature of the wavelength conversion element 2112 increased. The fiber grating 2108b is temperature controlled by the Peltier element so as to reach a predetermined standby temperature. The standby temperature may be, for example, a temperature at which the output intensity of the wavelength conversion element 2112 is 85 to 95% of the peak output intensity thereof and which is lower than the phase matching temperature.

First, in FIG. 17A, if the temperature of the wavelength conversion element 2112 decreases, the output of the wavelength conversion element 2112 increases as shown by an arrow A1 in FIG. 17A. At this time, a characteristic curve of the phase matching wavelength is shifted toward a shorter wavelength side as shown by an arrow A2 in FIG. 17A. Accordingly, the controller 2105 causes the oscillation wavelength of the fundamental wave emitted from the fiber laser 2103 to shift toward the shorter wavelength side by decreasing the temperature of the fiber grating 2108b. Thus, the output of the wavelength conversion element 2112 decreases as shown by an arrow A3 in FIG. 17A to return to the output at the standby temperature of the wavelength conversion element 2112.

On the other hand, if the temperature of the wavelength conversion element 2112 increases, the output of the wavelength conversion element 2112 decreases as shown by an arrow B1 in FIG. 17B. At this time, the characteristic curve of the phase matching wavelength is shifted toward a longer wavelength side as shown by an arrow B2 in FIG. 17B. Accordingly, the controller 2105 causes the oscillation wavelength of the fundamental wave emitted from the fiber laser 2103 to shift toward the longer wavelength side by increasing the temperature of the fiber grating 2108b. Thus, the output of the wavelength conversion element 2112 increases as shown by an arrow B3 in FIG. 17B to return to the output at the standby temperature of the wavelength conversion element 2112.

Figure 18:
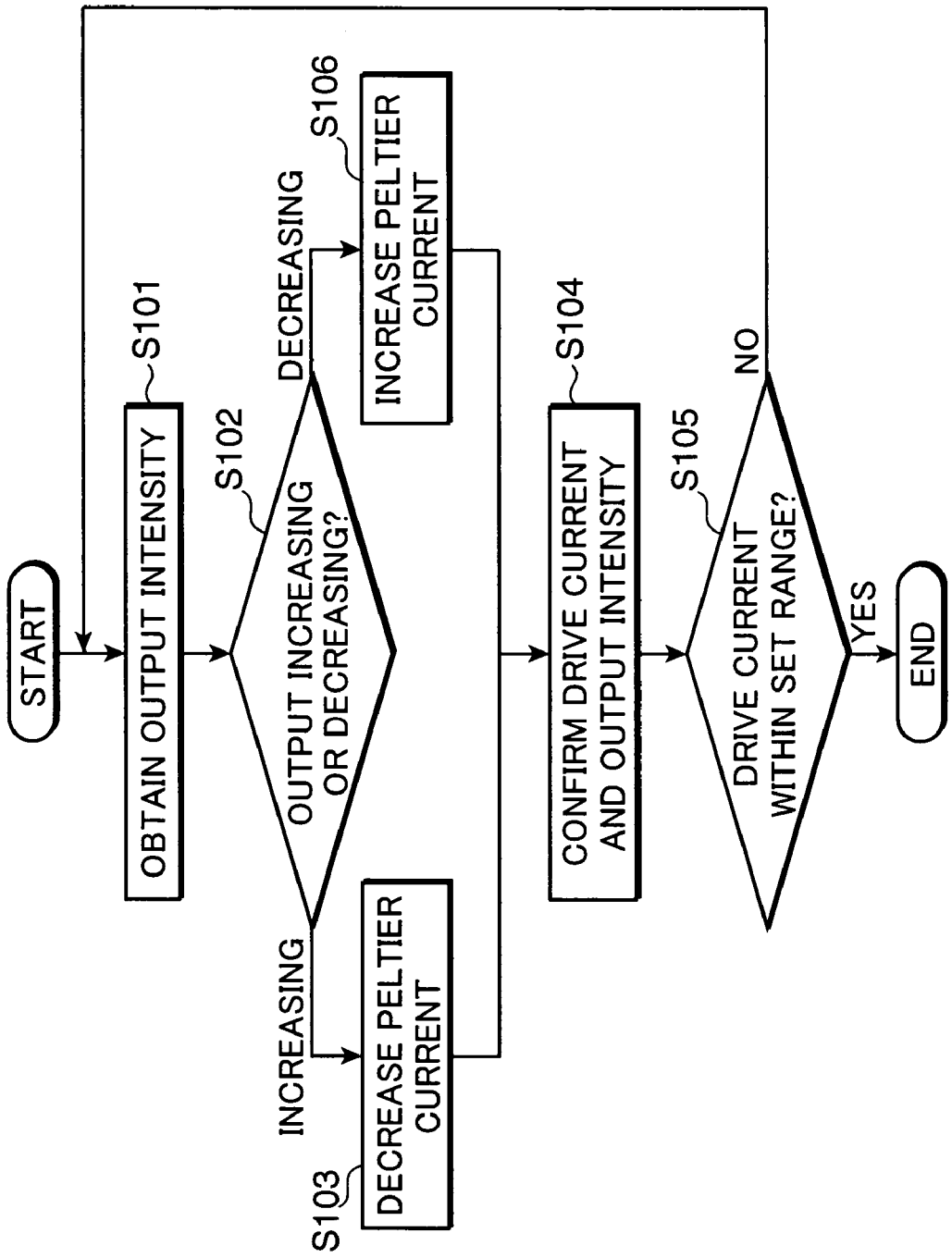
FIG. 18 is a flow chart showing the procedure of a fiber grating temperature controlling process.

FIG. 18 is a flow chart showing the procedure of the aforementioned process of temperature controlling the fiber grating 2108b by the controller 2105. First, the controller 2105 obtains the monitoring result on the output intensity of the return light from the wavelength conversion element 2112 by the photodiode 2116 (Step S101), and judges whether the output of the wavelength conversion element 2112 is increasing or decreasing (Step S102).

Subsequently, the controller 2105 decreases an average current flowing into the Peltier element of the fiber grating 2108b (Step S103) if it is judged that the output of the wavelength conversion element 2112 is increasing in Step S102. In this way, the temperature of the Peltier element is decreased to decrease the temperature of the fiber grating 2108b, whereby the oscillation wavelength of the fundamental wave emitted from the fiber laser 2103 is shifted toward the shorter wavelength side (see FIG. 17A).

Subsequently, the controller 2105 confirms that the value of drive current for the excitation laser 2107 supplied by the power source 2104 lies within a specified set range and also confirms the output intensity of the wavelength conversion element 2112 (Step S104). Then, the controller 2105 compares the drive current value from the power source 2104 and an initial current value, and ends the process if a difference between the two values lies within a specified set range (YES in Step S105) while repeating the above Steps S101 to S105 again if this difference lies outside the specified set range (NO in Step S105).

On the other hand, if it is judged that the output of the wavelength conversion element 2112 is decreasing in Step S102, the controller 2105 increases the average current flowing into the Peltier element of the fiber grating 2108b (Step S106). In this way, the temperature of the Peltier element is increased to increase the temperature of the fiber grating 2108b, whereby the oscillation wavelength of the fundamental wave emitted from the fiber laser 2103 is shifted toward the longer wavelength side (see FIG. 17B). Then, this process proceeds to Step S105.

In this way, the aforementioned temperature control of the fiber grating 2108b by the controller 2105 is carried out.

In this embodiment, the bandwidths of the reflection wavelengths of the fiber gratings 2108b, 2109b are preferably 1 nm or longer in order to correspond to the shift amounts of the reflection wavelengths of the fiber gratings 2108b, 2109b. In order to suppress a change in the oscillation efficiency of the cavity caused by the shifts of the reflection wavelengths of the fiber gratings 2108b, 2109b, the top shapes of the bands of the reflection wavelengths of the fiber gratings 2108a, 2109a are preferably minimally rippled, i.e. as flat as possible.

Although the temperatures of the fiber gratings 2108b, 2109b are controlled in this embodiment, the fiber gratings 2108a, 2108b and the fiber gratings 2109a, 2109b may be paired and temperature controlled together. Further, each pair may be sealed in a temperature compensating package. By doing so, effects similar to the above can be obtained even if the bands of the reflection wavelengths of the fiber gratings 2108a and 2109a are 0.2 to 1 nm.

By controlling the output intensities of the visible lights wavelength converted based on the oscillation wavelength of the fiber laser 2103 in this way, wiring from the laser oscillator 2101 to the laser light irradiator 2102 can be reduced, thereby improving a degree of freedom in designing the laser light irradiator 2102. Further, since the wiring and the like that stands as a hindrance upon performing a surgery while actually holding the laser light irradiator 2102 by the hand are reduced, the usability of the laser light irradiator 2102 can be improved.

Figure 19A:
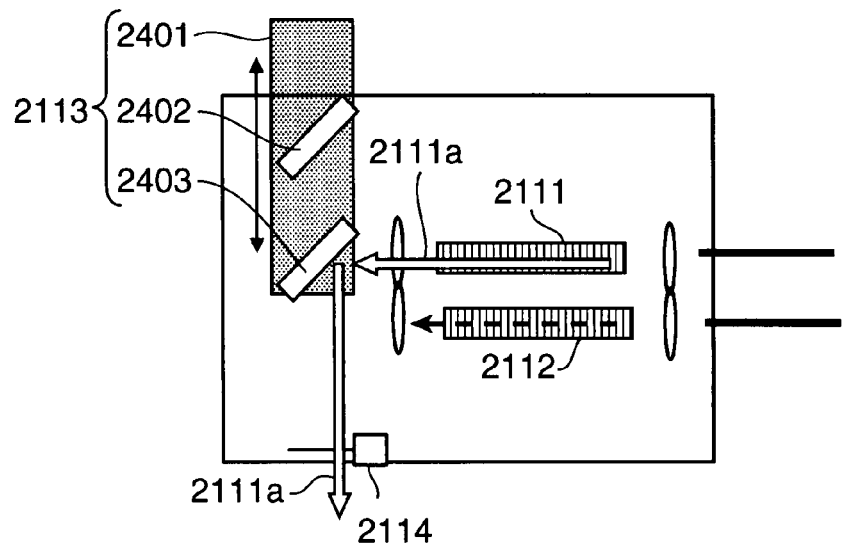
FIG. 19A is a diagram showing a schematic construction of a laser light irradiator.
Figure 19B:
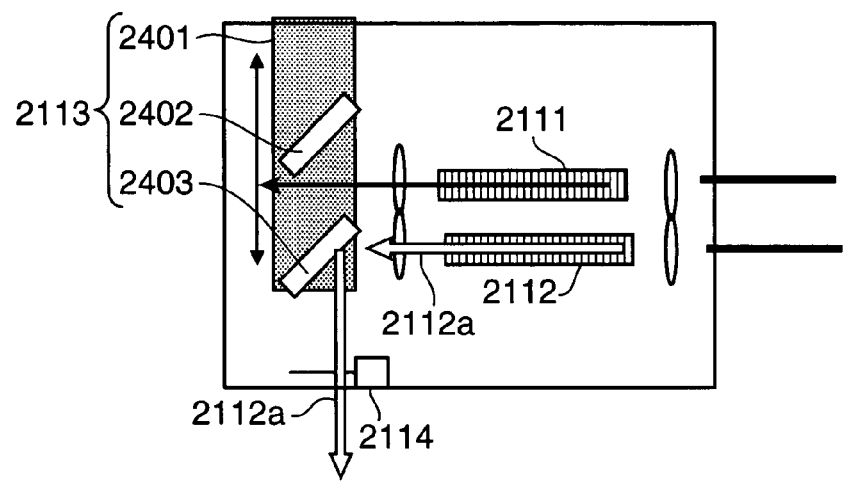
FIG. 19B is a diagram showing another schematic construction of the laser light irradiator.
Figure 19C:
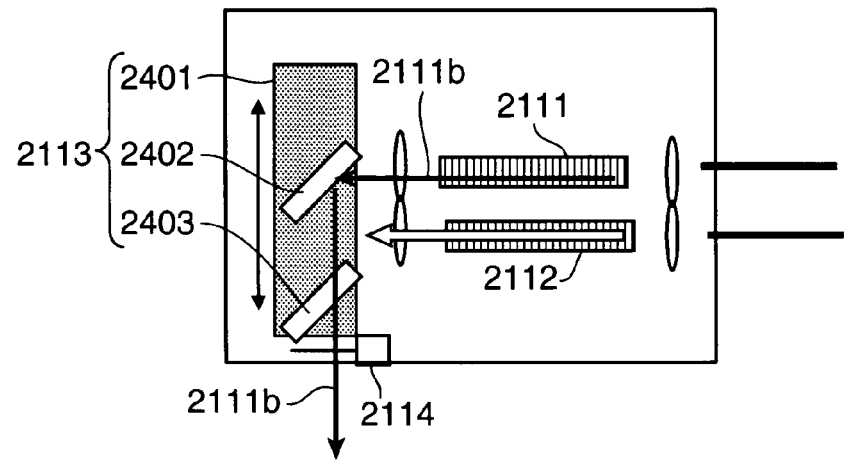
FIG. 19C is a diagram showing still another schematic construction of the laser light irradiator.

Next, a wavelength change of the emitted light by the operation of the laser light irradiator 2102 is described. FIGS. 19A to 19C show a schematic construction of the laser light irradiator 2102.

As shown in FIGS. 19A to 19C, the laser light irradiator 2102 includes the two wavelength conversion elements 2111, 2112 and the light selector 2113, wherein the light selector 2113 is comprised of a pedestal 2401 movable in directions shown by arrows in FIGS. 19A to 19C, a first dielectric multilayer film mirror 2402 arranged on the pedestal 2401 for reflecting only infrared lights, and a second dielectric multilayer film mirror 2403 arranged adjacent to the first dielectric multilayer film mirror 2402 on the pedestal 2401 for reflecting only visible lights.

FIG. 19A shows a state where the second dielectric multilayer film mirror 2403 is located to face the light emission surface of the wavelength conversion element 2111 for emitting a green light 2111a. In this case, the green light 2111a is caused to be emitted from the laser light irradiator 2102 since the second dielectric multilayer film mirror 2403 for reflecting only visible lights is located before the light emission surface of the wavelength conversion element 2111.

FIG. 19B shows a state where the second dielectric multilayer film mirror 2403 is located to face the light emission surface of the wavelength conversion element 2112 for emitting an orange light 2112a. In this case, the orange light 2112a is caused to be emitted from the laser light irradiator 2102 since the second dielectric multilayer film mirror 2403 for reflecting only visible lights is located before the light emission surface of the wavelength conversion element 2112.

FIG. 19C shows a state where the first dielectric multilayer film mirror 2402 is located to face the light emission surface of the wavelength conversion element 2111 for emitting an infrared light 2111b. In this case, the unconverted infrared light 2111b out of the fundamental wave incident on the wavelength conversion element 2111 is caused to be emitted from the laser light irradiator 2102 since the first dielectric multilayer film mirror 2402 for reflecting only infrared lights is located before the light emission surface of the wavelength conversion element 2111.

In this way, the wavelength of the emitted light can be changed by the operation of the laser light irradiator 2102.

In this embodiment, the oscillation efficiency of the fiber laser 2103 can be optimized by controlling the fiber laser 2103 of the laser oscillator 2101 in accordance with the wavelength of the light emitted from the laser light irradiator 2102. This optimization of the oscillation efficiency is described below.

For example, the light emitted from the laser light irradiator 2102 is the green light 2111a in the state of FIG. 19A. Accordingly, the fundamental wave to be emitted from the laser oscillator 2101 is a light having a wavelength of 1064 nm that becomes a fundamental wave of the green light 2111a emitted from the wavelength conversion element 2111, and a light having a wavelength of 1178 nm that becomes a fundamental wave of the orange light emitted from the wavelength conversion element 2112 is unnecessary. Accordingly, in this case, the controller 2105 performs the temperature control of the fiber grating 2108b or the tensile stress application control so that the reflection wavelength band of the fiber grating 2108b for oscillating the light having a wavelength of 1178 nm departs from the reflection wavelength band of the fiber grating 2108a. By doing so, the oscillation of the light having a wavelength of 1178 nm can be stopped to utilize all the excitation energy of the excitation laser 2107 for the oscillation of the light having a wavelength of 1064 nm by the fiber grating 2109b. Therefore, the oscillation efficiency of the light having a wavelength of 1064 nm by the fiber grating 2109b can be improved.

Figure 20A:
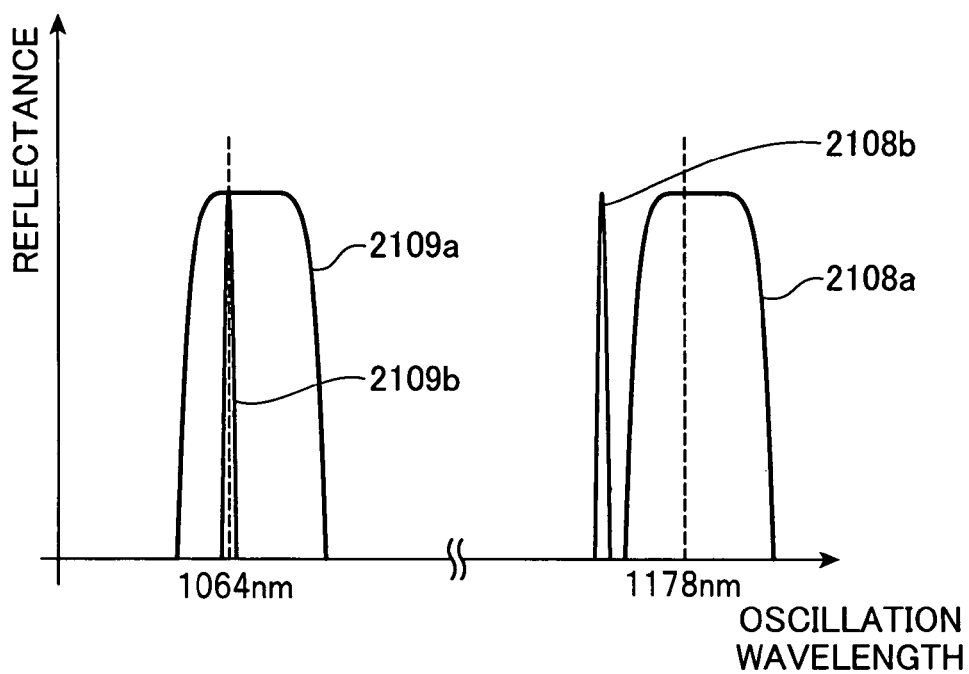
FIG. 20A is a graph showing a relationship between oscillation wavelengths of a fiber laser and reflection wavelength bands of a fiber grating.

FIG. 20A shows a relationship between the oscillation wavelength of the fiber laser 2103 and the reflection wavelength bands of the fiber gratings 2108a, 2108b, 2109a and 2109b. As described above, the reflection wavelength band of the fiber grating 2108b departs from that of the fiber grating 2108a at an oscillation wavelength of 1178 nm, and the reflection wavelength band of the fiber grating 2109b is located within the reflection wavelength band of the fiber grating 2109a at an oscillation wavelength of 1064 nm.

Next, in the state of FIG. 19B, the irradiated light from the laser light irradiator 2102 is the orange light 2112a. Accordingly, the fundamental wave to be emitted from the laser oscillator 2101 is a light having a wavelength of 1178 nm that becomes a fundamental wave of the orange light 2112a emitted from the wavelength conversion element 2112, and a light having a wavelength of 1064 nm that becomes a fundamental wave of the green light emitted from the wavelength conversion element 2111 is unnecessary. However, if the oscillation of the light having a wavelength of 1064 nm is completely stopped as in the case of generating the green light, the fiber laser 2103 is broken by the generation of giant pulses of the ASE light. Thus, the controller 2105 performs the temperature control of the fiber grating 2109b or the tensile stress application control such that the reflection wavelength band of the fiber grating 2109b for oscillating the light having a wavelength of 1064 nm overlaps the edge of the reflection wavelength band of the fiber grating 2109a. By doing so, the light having a wavelength of 1064 nm can be caused to weakly oscillate and the giant pulses of the ASE light can be prevented. Thus, most of the excitation energy of the excitation laser 2107 can be utilized for the oscillation of the light having a wavelength of 1178 nm by the fiber grating 2108b. Therefore, the oscillation efficiency of the light having a wavelength of 1178 nm by the fiber grating 2108b can be improved without generating the ASE light.

Figure 20B:
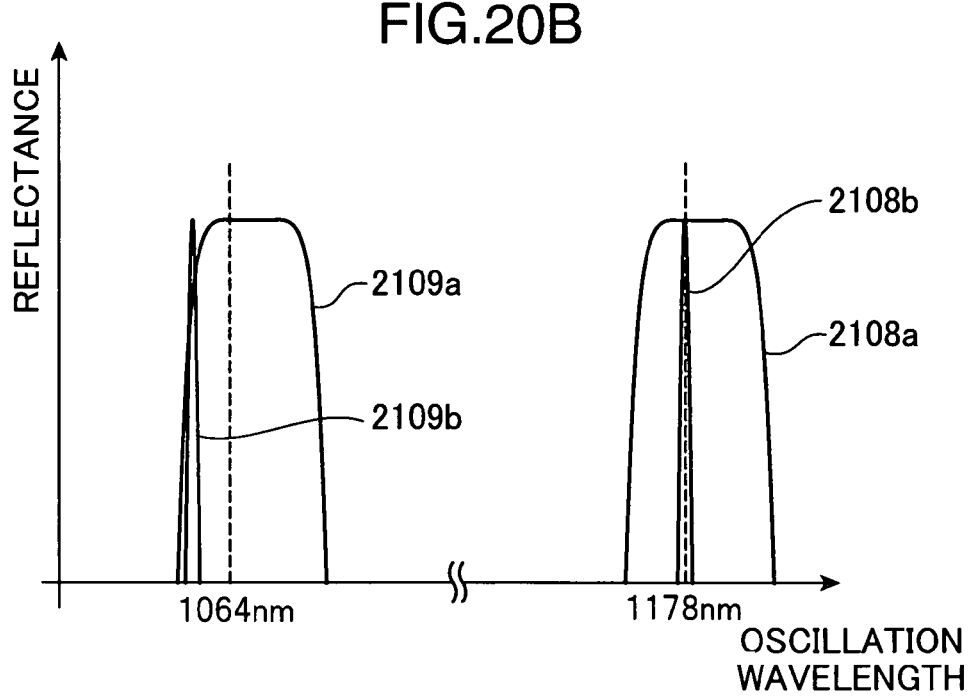
FIG. 20B is a graph showing another relationship between oscillation wavelengths of the fiber laser and reflection wavelength bands of the fiber grating.

FIG. 20B shows a relationship between the oscillation wavelength of the fiber laser 2103 and the reflection wavelength bands of the fiber gratings 2108a, 2108b, 2109a and 2109b. As descried above, the reflection wavelength band of the fiber grating 2109b overlaps the edge of the reflection wavelength band of the fiber grating 2109a at the oscillation wavelength of 1064 nm, and the reflection wavelength band of the fiber grating 2108b is located within the reflection wavelength band of the fiber grating 2108a.

Next, in the state of FIG. 19C, the emitted light from the laser light irradiator 2102 is the infrared light 2111b that is the fundamental wave to be incident on the wavelength conversion element 2111. Accordingly, the fundamental wave to be emitted from the laser oscillator 2101 is a light having a wavelength of 1064 nm that becomes a fundamental wave of the green light 2111a emitted from the wavelength conversion element 2111, and a light having a wavelength of 1178 nm that becomes a fundamental wave of the orange light emitted from the wavelength conversion element 2112 is unnecessary. Accordingly, in this case, the controller 2105 performs the temperature control of the fiber grating 2108b or the tensile stress application control such that the reflection wavelength band of the fiber grating 2108b for oscillating the light having a wavelength of 1178 nm departs from the reflection wavelength band of the fiber grating 2108a. By doing so, the oscillation of the light having a wavelength of 1178 nm can be stopped to utilize all the excitation energy of the excitation laser 2107 for the oscillation of the light having a wavelength of 1064 nm by the fiber grating 2109b. Therefore, the oscillation efficiency of the light having a wavelength of 1064 nm by the fiber grating 2109b can be improved. By not meeting the phase matching condition of the wavelength conversion element 2111, the wavelength conversion efficiency by the wavelength conversion element 2111 is reduced, whereby an extracted amount of the unconverted infrared light 2111b can be increased.

Further in this embodiment, a laser light emission time can be determined by a user by using the turn-on switch 2106 of the laser oscillator 2101 and a shutter 2114 of the laser light irradiator 2102, whereby the power consumption of the fiber laser 2103 can be reduced. This reduction of the power consumption is described below.

FIG. 21 is a flow chart showing the procedure of an irradiation process of the laser light irradiator 2102 by the turn-on switch 2106 and the laser light irradiator 2102. First, when the turn-on switch 2106 is turned on by a user of the laser light source device 2100 (Step S201), a turn-on instruction is notified from the turn-on switch 2106 to the controller 2105 (Step S202).

The controller 2105 controls the power source 2104 in accordance with the turn-on instruction from the turn-on switch 2106, thereby causing the excitation laser 2107 to be turned on by a predetermined drive current supplied to the excitation laser 2107 (Step S203). The controller 2105 monitors, by means of the photodiodes 2115, 2116, return lights of visible lights emitted from the wavelength conversion elements 2111, 21112 when the excitation laser 2107 is turned on. Using these monitoring results, the controller 2105 controls the reflection wavelengths of the fiber gratings 2108b, 2109b so as to maximize the output intensities of the wavelength conversion elements 2111, 2112, thereby changing the oscillation wavelength of the fiber laser 2103 (Step S204). Here, the control of the reflection wavelengths of the fiber gratings 2108b, 2109b may be performed through the temperature control or the tensile stress application control as described above.

Subsequently, the controller 2105 causes the shutter 2114 of the laser light irradiator 2102 to be opened and causes emitted lights of the wavelength conversion elements 2111, 2112 to be irradiated from the laser light irradiator 2102 (Step S206) when the outputs of the wavelength conversion elements 2111, 2112 are stabilized (YES in Step S205). On the other hand, Steps S204 and S205 are repeated unless the outputs are stabilized in Step S205 (NO in Step S205).

In this way, the light irradiating operation by the turn-on switch 216 and the laser light irradiator 2102 is performed.

In this embodiment, by adopting a method for changing the oscillation wavelength of the fiber laser 2103 as a method for satisfying the phase matching conditions of the wavelength conversion elements 2111, 2112, the light emitting operation from the operation of the turn-on switch 2106 to the emission of a visible laser light can be performed within a period of 200 μs or shorter.

In the case of satisfying the phase matching conditions through the temperature controls of the wavelength conversion elements 2111, 2112, the wavelength conversion elements 2111, 2112 preferably have small heat capacities. This is because time constants at the time of the temperature controls can be made smaller and the phase matching conditions can be satisfied within a shorter period of time by using the wavelength conversion elements having small heat capacities.

By shortening the period from the operation of the turn-on switch 2106 to the light irradiation from the laser light irradiator 2102 in this way, it is no longer necessary to keep the fiber laser 2103 on standby and remarkably lower power consumption can be realized.

Figure 22:
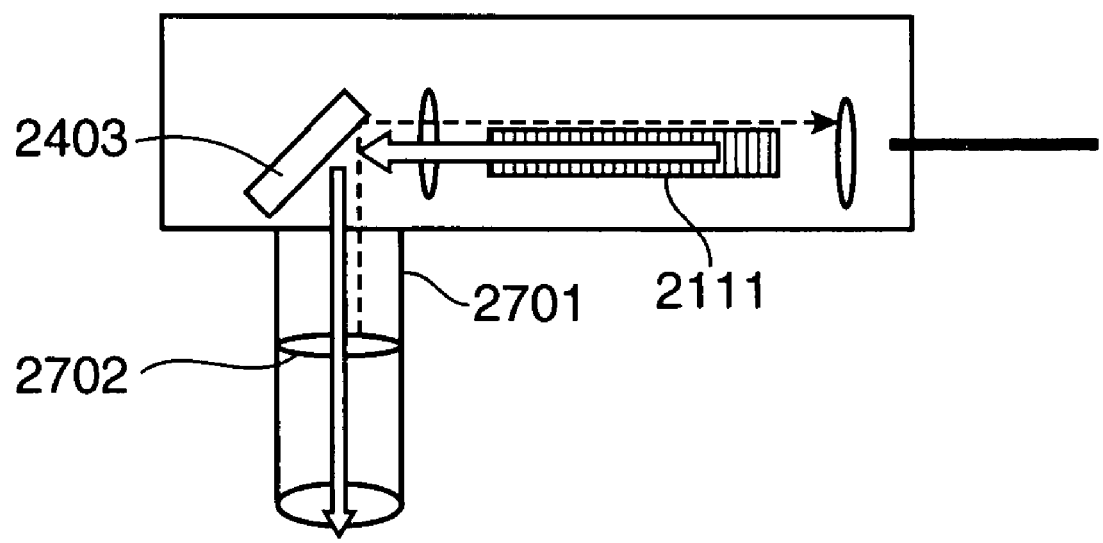
FIG. 22 is a diagram showing a schematic construction in which a probe is attached to a light irradiation surface of the laser light irradiator.

In this embodiment, in the case of using a different laser light irradiator 2102 for each oscillation wavelength, the irradiation range of the laser light irradiator 2102 can be determined by attaching a probe to the leading end of the laser light irradiator 2102. FIG. 22 shows a schematic construction in which a probe is attached to the light emission surface of the laser light irradiator 2102.

As shown in FIG. 22, a probe 2701 is provided on the light emission surface of the laser light irradiator 2102. A reflection mirror 2702 having a reflectance of, e.g. about 10% relative to the light emitted from the wavelength conversion element 2111. The light emitted from the wavelength conversion element 2111 is partly reflected by the reflection mirror 2702, and this reflected light passes through the wavelength conversion element 2111 again and the fiber 2117 to be monitored by the photodiode 2115 of the laser oscillator 2101. In this way, whether or not the probe is attached can be detected based on the presence or absence of the above reflected light, whereby the erroneous use of the laser light irradiator 2102 can be prevented. If the type of the probe used differs depending on the wavelength range of the emitted light, the erroneous use of the probe for the wavelength in use can be prevented by disposing a reflection mirror suitable for the reflection of lights in the wavelength range suited to each probe.

In this embodiment, a stable visible laser light having a desired output can be obtained from the startup of the laser by correcting the excitation energy of the excitation laser 2107. For example, there may be provided a correction mode for correcting the monitoring results by the photodiodes 2115, 2116 of the laser oscillator 2101 and actual output intensities of the wavelength conversion elements 2111, 2112. A correlation between actual output intensity and a monitoring result is obtained from the actual output intensities and the monitoring results of the photodiodes 2115, 2116 by directly taking the light emitted from the laser light irradiator 2102 into the laser oscillator 2101. This correlation data is stored as a correction data in a storage medium such as a register in the controller 2105. By this operation, a stable visible laser light having a desired output can be obtained from the startup of the excitation laser 2107.

Figure 23:
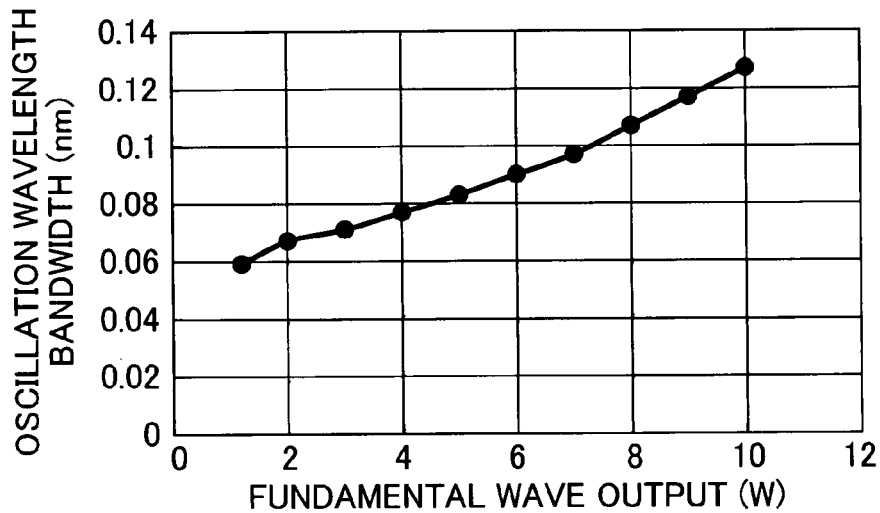
FIG. 23 is a graph showing a relationship between the fundamental wave output and oscillation wavelength bandwidth of the fiber laser.
Figure 24:
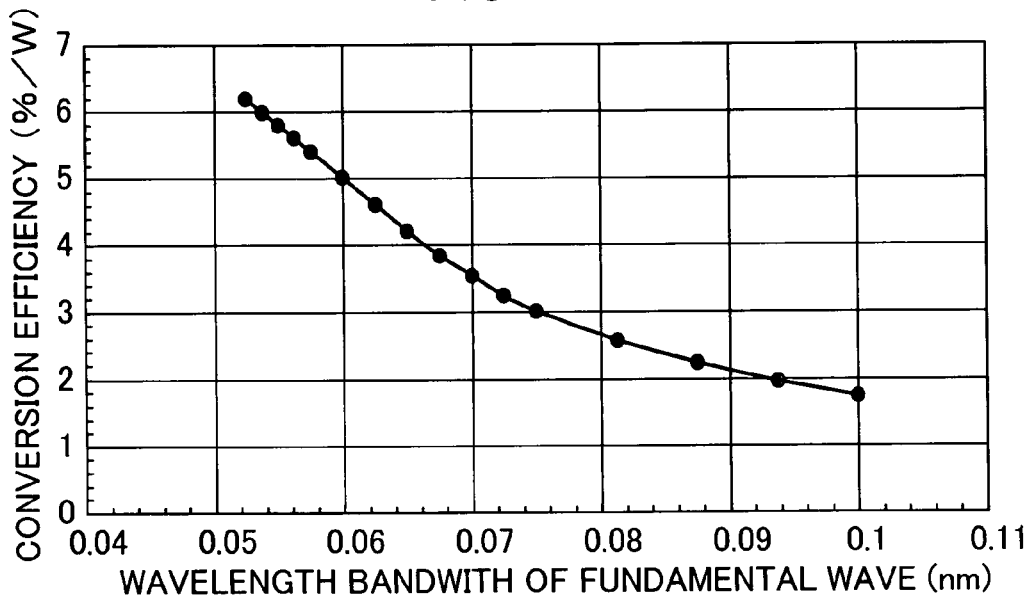
FIG. 24 is a graph showing a relationship between the wavelength bandwidth of fundamental wave and conversion efficiency of the fiber laser.
Figure 25:
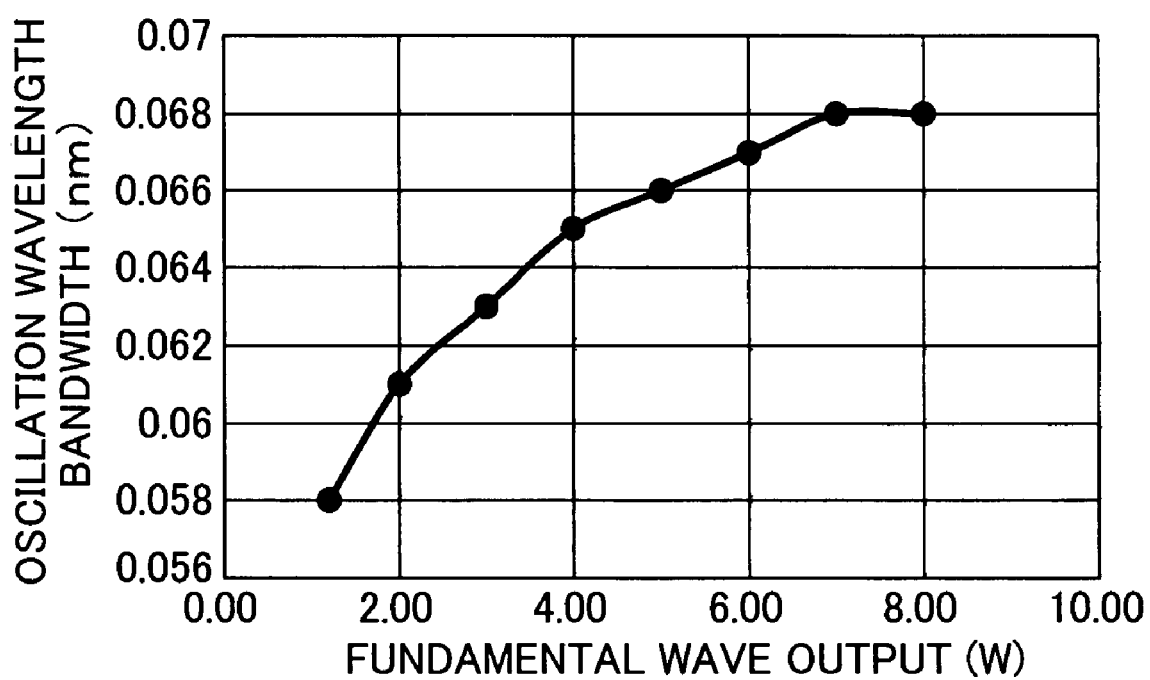
FIG. 25 is a graph showing another relationship between the fundamental wave output and oscillation wavelength bandwidth of the fiber laser.
Figure 26A:
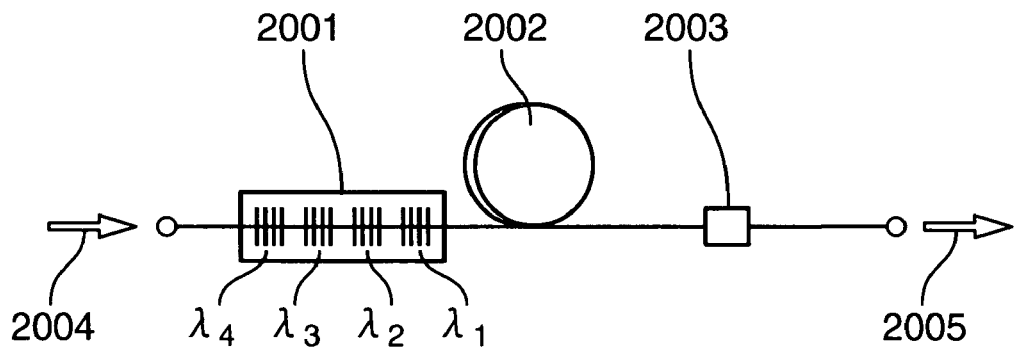
FIG. 26A is a diagram showing a schematic construction of a conventional fiber laser.
Figure 26B:
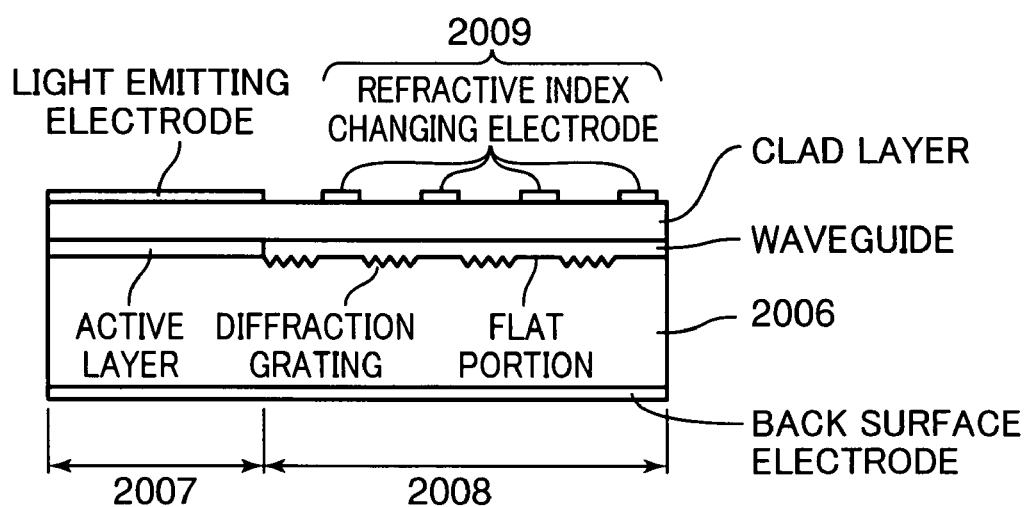
FIG. 26B is a section showing a schematic construction of a conventional semiconductor laser.

It has been known that the fiber gratings 2108b, 2109b are heated by oscillation lights upon an increase of the output of the fiber laser 2103, thereby causing nonuniform thermal expansion to widen the width of reflection wavelength band as shown in FIG. 23. For example, FIG. 24 shows a relationship between a wavelength bandwidth of the fundamental wave of the laser light of the fiber laser 2103 and wavelength conversion efficiency from the fundamental wave into the harmonic wave (standardized wavelength conversion efficiency) in the case of forming the wavelength conversion elements 2111, 2112 by the quasi phase matching of Mg:LiNbO$_3$ crystal having a polarization reversal period length of 25 mm. As shown in FIG. 24, as a result of widening the widths of the reflection wavelength bands of the fiber gratings 2108b, 2109b, there are problems of widening the wavelength bandwidth of the fundamental wave emitted from the fiber laser 2103 and reducing the wavelength conversion efficiency by the wavelength conversion elements 2111, 2112. Normally, the maximum wavelength conversion efficiency of the wavelength conversion element using Mg:LiNbO$_3$ crystal is about 6.5%/W, but it becomes difficult to maximally increase the wavelength conversion efficiency if the wavelength bandwidth of the fundamental wave becomes larger. Thus, the wavelength bandwidth of the fundamental wave of the laser light of the fiber laser 2103 is preferably 0.6 nm or shorter in order to use the wavelength conversion element at 90% or higher of the maximum wavelength conversion efficiency. In this embodiment, partial thermal expansion can be evened out by fixing the fiber gratings 2108b, 2109b while applying tensile stresses to them in view of this problem. Therefore, as shown in FIG. 25, the spread of the bandwidth of the fundamental wave is suppressed and a reduction in the wavelength conversion efficiency from the fundamental wave into the visible light can be prevented even if the output of the fiber laser 2103 increases.

Although a laser having wavelengths of 915 nm and 975 nm is generally used as the excitation laser 2107 of the fiber laser 2103 in this embodiment, a laser light source having wavelengths other than these may be used if it can excite the fiber laser 2103.

Further, although MgO:LiNbO$_3$ having a polarization reversal period structure is used for the wavelength conversion elements 2111, 2112, a wavelength conversion element made of another material or having another structure may be used. For example, potassium titanium photophate (KTP) or Mg:LiTaO$_3$ having a polarization reversal period structure may be used.

The range of the oscillation wavelength of the fundamental wave of the laser light of the fiber laser 2103 is preferably 1028 to 1064 nm and 1120 to 1200 nm in view of the relationship with the absorption spectrum of hemoglobin contained in blood if it is particularly restricted to the field of medical devices.

As described above, according to the fifth embodiment, the power consumption of the entire device can be reduced by decreasing the optical loss of the laser light. Further, the intermode competition can be prevented by orthogonalizing the polarization directions of lights having different wavelengths, whereby a stable laser light output can be obtained. Furthermore, by making the Q-value of the laser cavity variable based on the oscillation wavelength, inadvertent pulse oscillation of the laser light can be prevented while a reduction in the efficiency of the laser oscillator is suppressed. Therefore, the reliability of the device can be improved.

Since the laser light source device according to the above fifth embodiment has low power consumption at high luminance, it is useful in the field of medical devices used at eye clinics and is also applicable as a display device such as a laser display.

The present invention can be summarized as follows from the above respective embodiments. Specifically, a laser light source device according to the present invention comprises a laser light source for emitting an excitation light; a laser cavity including a fiber which contains a laser-active substance and on which the excitation light from the laser light source is incident, a first fiber grating provided at a side of the fiber toward the laser light source and having a plurality of reflection peaks, and a second fiber grating provided at a light emission end of the fiber and having a plurality of reflection peaks; a wavelength converter for converting a fundamental wave emitted from the laser cavity into a harmonic wave; a reflection wavelength varying unit capable of shifting the reflection wavelengths of the reflection peaks of the second fiber grating; and a controller for controlling the oscillation wavelength of the laser cavity by means of the reflection wavelength varying unit and controlling a phase matching condition of the wavelength converter, intervals between adjacent reflection peaks of the first fiber grating being different from those between adjacent reflection peaks of the second fiber grating.

Since each of the first and second fiber gratings has a plurality of reflection peaks and the intervals between the reflection peaks of the first fiber grating and those between the reflection peaks of the second fiber grating are set to be different in the above laser light source device, the oscillation wavelength of the laser cavity can be switched by shifting the reflection wavelengths of the reflection peaks of the second fiber grating.

Grating lengths for specifying the reflectances at the respective reflection peaks of the second fiber grating are preferably set to successively become longer in a decreasing direction of the oscillation wavelength of the laser cavity so as to prevent a reduction in the oscillation efficiency of the fiber resulting from a decrease of the oscillation wavelength of the laser cavity.

In this case, the oscillation efficiency of the fiber can be maintained even if the oscillation wavelength of the laser cavity is decreased. Particularly, a reduction in the oscillation efficiency of the fiber resulting from a decrease of the oscillation wavelength of the laser cavity is notable upon oscillating a light in a wavelength band of 1045 to 1070 nm. Accordingly, in this case, the output of the light in the wavelength band of 1045 to 1070 nm can be improved.

It is preferable that the bandwidths of the reflection peaks of the first fiber grating are wider than those of the reflection peaks of the second fiber grating; and that the reflectances at the reflection peaks of the first fiber grating are larger than those at the reflection peaks of the second fiber grating.

In this case, accuracy required for a control of shifting the reflectances of the reflection peaks of the second fiber grating can be reduced since the bandwidths of the reflection peaks of the first fiber grating are wider than that of the reflection peaks of the second fiber grating, and the fundamental wave can be efficiently emitted from the second fiber grating since the reflectances at the reflection peaks of the first fiber grating are larger than those at the reflection peaks of the second fiber grating.

It is preferable that the bandwidths of the reflection peaks of the first fiber grating are 0.5 to 2 nm; and that the bandwidths of the reflection peaks of the second fiber grating are 0.2 nm or shorter.

In this case, the reflection peaks of the second fiber grating can be reliably brought into coincidence with those of the first fiber grating upon shifting the reflectances of the reflection peaks of the second fiber grating.

It is preferable that the reflectances at the reflection peaks of the first fiber grating are 95% or higher; and that those at the reflection peaks of the second fiber grating are 5 to 20%.

In this case, the laser light can be efficiently emitted while the breakage of an excitation laser by the laser light from the laser cavity is prevented.

The controller preferably switches the oscillation wavelength of the laser cavity by the shift of the reflection wavelengths at the reflection peaks of the second fiber grating by the wavelength converter and changes the phase matching condition of the wavelength converter in accordance with the switched oscillation wavelength.

In this case, the fundamental wave can be efficiently wavelength converted into the harmonic wave since the phase matching condition of the wavelength converter is changed in conformity with the switch of the oscillation wavelength of the fundamental wave emitted from the laser cavity.

It is preferable that the wavelength converter includes a first wavelength conversion element made of nonlinear crystal using angle phase matching and a first holder for holding the first wavelength conversion element and setting an incident angle of the fundamental wave emitted from the laser cavity on the first wavelength conversion element in accordance with the oscillation wavelength of the laser cavity so as to satisfy an angle phase matching condition of the first wavelength conversion element; and that the controller controls the phase matching condition of the wavelength converter by means of the first holder.

In this case, the fundamental wave from the laser cavity can be efficiently wavelength converted into the harmonic wave in the case of making the wavelength conversion element of the nonlinear crystal using the angle phase matching.

It is preferable that the wavelength converter includes a second wavelength conversion element made of nonlinear crystal using angle phase matching and a second holder for holding the second wavelength conversion element and setting an incident angle of the fundamental wave emitted from the first wavelength conversion element on the second wavelength conversion element in accordance with the oscillation wavelength of the laser cavity so as to satisfy an angle phase matching condition of the second wavelength conversion element, the second holder being so arranged as to suppressed a change of an optical axis caused by the first holder; and that the controller controls the phase matching condition of the wavelength converter by means of the first and second holders.

In this case, the change of the optical axis caused upon the wavelength conversion can be suppressed even if the wavelength conversion elements are made of the nonlinear crystal using the angle phase matching.

It is preferable that the wavelength converter includes a wavelength conversion element made of nonlinear crystal using temperature phase matching and a holder for holding the wavelength conversion element and setting the temperature of the wavelength conversion element in accordance with the oscillation wavelength of the laser cavity so as to satisfy a temperature phase matching condition of the wavelength conversion element; and that the controller controls the phase matching condition of the wavelength converter by means of the holder.

In this case, the fundamental wave from the laser cavity can be efficiently wavelength converted into the harmonic wave in the case of making the wavelength conversion element of the nonlinear crystal using the temperature phase matching.

It is preferable that the wavelength converter includes a wavelength conversion element made of nonlinear crystal using quasi phase matching and having a polarization reversal period structure and a holder for holding the wavelength conversion element and causing the fundamental wave emitted from the laser cavity to be incident in a polarization reversal period area of the wavelength conversion element in accordance with the oscillation wavelength of the laser cavity so as to satisfy a quasi phase matching condition of the wavelength conversion element; and that the controller controls the phase matching condition of the wavelength converter by means of the holder.

In this case, the fundamental wave from the laser cavity can be efficiently wavelength converted into the harmonic wave in the case of making the wavelength conversion element of the nonlinear crystal using the quasi phase matching.

It is preferable that the period of the polarization reversal period structure of the wavelength conversion element changes in a direction perpendicular to the incident direction of the fundamental wave emitted from the laser cavity; and that the holder includes a stage capable of moving the wavelength conversion element in such a direction as to change the period of the polarization reversal period structure in accordance with the oscillation wavelength of the laser cavity.

In this case, conversion efficiency from the fundamental wave into the harmonic wave can be improved since the period of the polarization reversal structure of the wavelength conversion element can have an optimal length.

The period of the polarization reversal structure of the wavelength conversion element preferably changes along the incident direction of the fundamental wave emitted from the laser cavity.

In this case, the wavelength converter can be realized by a simple construction since the fundamental wave can be incident in the polarization reversal period area in accordance with the oscillation wavelength of the laser cavity without being accompanied by a movement of the wavelength conversion element.

It is preferable that there are two reflection peaks each of which has an overlapping portion between the first and second fiber gratings; and that the ranges of the respective reflection wavelengths of the two reflection peaks are 1000 to 1090 nm and 1100 to 1180 nm.

In this case, the breakage of the laser cavity by the generation of an ASE light can be prevented by causing the simultaneous generation of a light in the wavelength range of 1000 to 1090 nm even in the case of generating a light in the wavelength range of 1100 to 1180 nm.

An image display device according to the present invention comprises the above laser light source device; a projector control circuit including a wavelength determining circuit connected to the controller of the laser light source device for outputting a selection signal used to determine the oscillation wavelength of the laser light source device to the controller, and a luminance signal judging circuit for judging the luminance of a video signal based on a luminance signal included in the video signal to be displayed by a laser light emitted from the laser light source device; a video mode switching unit for instructing the oscillation wavelength of the laser light source device inputted by a user of the image display device to the wavelength determining circuit; and a power source control circuit for judging the type and remaining amount of a power source used by the image display device and outputting the judged type and remaining amount of the power source to the wavelength determining circuit.

In the above image display device, the oscillation wavelength of the laser light emitted from the laser light source device can be switched in accordance with the kind of the video signal and the status of use of the power source. Thus, there can be realized an image display device having a wide color reproduction area at high luminance, a high image quality and low power consumption.

A microscope device according to the present invention comprises the above laser light source device, and a microscope unit for enabling the observation of the light emission of a fluorescent sample caused by the excitation of the fluorescent sample in response to the irradiation of a laser light emitted from the laser light source device.

In the above microscope device, a plurality of fluorescent samples can be efficiently excited since the oscillation wavelength of the laser light emitted from the laser light source device can be switched depending on the fluorescent sample.

Another laser light source device according to the present invention comprises a laser oscillator for emitting at least two fundamental waves; a laser light irradiator adapted to convert the at least two fundamental waves emitted from the laser oscillator respectively into harmonic waves and capable of irradiating the converted harmonic waves; and a fiber unit disposed between the laser oscillator and the laser light irradiator for transmitting the fundamental waves emitted from the laser oscillator to the laser light irradiator, wherein the laser oscillator includes a laser light source for emitting an excitation light; and a laser cavity including a fiber which contains a laser-active substance and on which the excitation light from the laser light source is incident, at least two first fiber gratings provided at a side of the fiber toward the laser light source, and at least two second fiber gratings provided at a light emission end of the fiber and having a one-to-one correspondence with the at least two second fiber gratings.

In the above laser light source device, at least two fundamental waves are emitted from the laser oscillator, transmitted to the laser light irradiator via the fiber unit, and respectively wavelength converted into harmonic waves by the laser light irradiator. Thus, at least two laser lights having different wavelengths can be more efficiently oscillated and irradiated than before.

It is preferable that the laser cavity further includes a light branching unit for branching the light emitted from the fiber in accordance with polarization directions; and that any one of branched lights branched by the light branching unit is incident on each second fiber grating.

In this case, the intermode competition occurring at the time of multiwavelength oscillation can be suppressed since the fundamental wave of a different wavelength is oscillated in each polarization direction of the light emitted from the fiber.

Each second fiber grating is preferably constructed such that the reflection wavelength thereof is shiftable so as to make a Q-value of the cavity formed between the second fiber grating and the corresponding first fiber grating variable.

In this case, the Q-value of the cavity formed between the first and second fiber gratings can be changed by shifting the reflection wavelength of the second fiber grating. Thus, the Q-value of the cavity of the fundamental wave unnecessary for the light irradiation by the laser light irradiator can be decreased to stop the oscillation of the cavity.

It is preferable that the laser light irradiator includes at least two wavelength conversion elements for converting the fundamental wave emitted from the laser cavity into harmonic waves and optical members for reflecting parts of the harmonic waves emitted from the wavelength conversion elements; that the harmonic waves reflected by the optical members are fed back to the laser oscillator by the fiber unit; and that the laser oscillator changes the oscillation wavelength of the laser cavity based on the output intensities of the fed-back harmonic waves.

In this case, the outputs of the harmonic waves emitted from the laser light irradiator can be stabilized since the oscillation wavelength of the laser cavity is changed based on the output intensities of the harmonic waves wavelength converted by the laser light irradiator.

The reflectances of the optical members are preferably 1 to 10%, and the optical members are preferably dielectric multilayer films arranged on the light emission surfaces of the wavelength conversion elements.

In this case, the laser oscillator can accurately detect the output intensities of the harmonic waves wavelength converted by the laser light irradiator.

The laser light irradiator preferably further includes a light selector for causing the laser light irradiator to selectively irradiate either one of the lights emitted from the at least two wavelength conversion elements.

In this case, the wavelength of the laser light emitted from the laser light irradiator can be switched.

The fiber unit preferably includes double-clad fibers.

In this case, the transmission of the fundamental wave from the laser oscillator to the laser light irradiator and that of the harmonic waves from the laser light irradiator to the laser oscillator can be efficiently performed.

The second fiber grating preferably has the reflection wavelength thereof shifted by a control of the temperature thereof or the application of a tensile stress thereto.

In this case, the reflection wavelength of the second fiber grating can be accurately shifted.

The laser oscillator preferably further includes a detector for detecting the output intensities of the harmonic waves fed back by the fiber unit, and a controller for controlling shift amounts of the reflection wavelengths of the second fiber gratings based on the output intensities of the harmonic waves detected by the detector.

In this case, the oscillation wavelength of the laser cavity can be changed in response to the output intensities of the harmonic waves wavelength converted by the laser light irradiator since the output intensities of the harmonic waves fed back from the laser light irradiator are detected and the shift amounts of the reflection wavelengths of the second fiber gratings are controlled based on the detected output intensities of the harmonic waves. As a result, the outputs of the harmonic waves emitted from the laser light irradiator can be stabilized.

The detector is preferably a light receiving element arranged in the vicinity of a connection point of the laser cavity and the fiber unit for receiving leak lights of the harmonic waves from the connection point.

In this case, the output intensities of the harmonic waves fed back from the laser light irradiator can be accurately grasped.

It is preferable that the laser oscillator further includes a switch unit to which a turn-on instruction to turn the laser light source on is inputted by a user of the laser light source device; that the controller causes the laser light source to be turned on in accordance with the turn-on instruction inputted via the switch unit and controls the shift amounts of the reflection wavelengths of the second fiber gratings to stabilize the output intensities of the harmonic waves detected by the detector; and the laser light irradiator further includes a switch for enabling the harmonic waves emitted from the wavelength conversion elements to be irradiated from the laser light irradiator after the output intensities of the harmonic waves are stabilized.

In this case, it is no longer necessary to constantly operate the laser light source since the light irradiation of the laser light irradiator is possible after the outputs of the harmonic waves wavelength converted by the laser light irradiator are stabilized. As a result, power consumption by the laser light source can be reduced.

The controller preferably causes the fundamental wave emitted from the laser cavity when the phase matching conditions of the wavelength conversion elements come to be not satisfied by the control of the shift amounts of the reflection wavelengths of the second fiber gratings to be emitted from the wavelength conversion elements without being wavelength converted by the wavelength conversion elements.

In this case, the output of the fundamental wave emitted from the laser light irradiator can be increased.

The reflection wavelength ranges of the at least two fundamental waves emitted from the laser cavity are preferably from 1000 to 1100 nm and from 1100 to 1200 nm.

In this case, the breakage of the laser cavity by the generation of an ASE light can be prevented by simultaneously generating a light in the wavelength band of 1000 to 1100 nm even in the case of generating a light in the wavelength range of 1100 to 1200 nm.

It is preferable that the wavelength conversion elements are composed of $Mg:LiNbO_3$ crystals using the quasi phase matching; and that the wavelength bandwidths of the fundamental waves emitted from the laser cavity is 0.06 nm or shorter.

In this case, wavelength conversion efficiency from the fundamental waves into the harmonic waves can be 90% or higher of a maximum wavelength conversion efficiency if the wavelength conversion elements are composed of $Mg:LiNbO_3$ crystals using the quasi phase matching.

This application is based on patent application No. 2006-172138 filed in Japan, the contents of which are hereby incorporated by references.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A laser light source device, comprising:
   a laser light source for emitting an excitation light;
   a laser cavity including a fiber which contains a laser-active substance and on which the excitation light from the laser light source is incident, a first fiber grating provided at a side of the fiber toward the laser light source and having a plurality of reflection peaks, and a second fiber grating provided at a light emission end of the fiber and having a plurality of reflection peaks;
   a wavelength converter for converting a fundamental wave emitted from the laser cavity into a harmonic wave;
   a reflection wavelength varying unit capable of shifting the reflection wavelengths of the reflection peaks of the second fiber grating; and
   a controller for controlling the oscillation wavelength of the laser cavity by means of the reflection wavelength varying unit and controlling a phase matching condition of the wavelength converter, wherein
   intervals between adjacent reflection peaks of the first fiber grating are different from those between adjacent reflection peaks of the second fiber grating.

2. A laser light source device according to claim 1, wherein grating lengths for specifying the reflectances at the respective reflection peaks of the second fiber grating are set to successively become longer in a decreasing direction of the oscillation wavelength of the laser cavity so as to prevent a reduction in the oscillation efficiency of the fiber resulting from a decrease of the oscillation wavelength of the laser cavity.

3. A laser light source device according to claim 1, wherein:
   the bandwidths of the reflection peaks of the first fiber grating are wider than those of the reflection peaks of the second fiber grating; and
   the reflectances at the reflection peaks of the first fiber grating are larger than those at the reflection peaks of the second fiber grating.

4. A laser light source device according to claim 3, wherein:
the bandwidths of the reflection peaks of the first fiber grating are 0.5 to 2 nm; and
the bandwidths of the reflection peaks of the second fiber grating are 0.2 nm or shorter.

5. A laser light source device according to claim 3, wherein:
the reflectances at the reflection peaks of the first fiber grating are 95% or higher; and
the reflectances at the reflection peaks of the second fiber grating are 5 to 20%.

6. A laser light source device according to claim 1, wherein the controller switches the oscillation wavelength of the laser cavity by the shift of the reflection wavelengths at the reflection peaks of the second fiber grating by the wavelength converter and changes the phase matching condition of the wavelength converter in accordance with the switched oscillation wavelength.

7. A laser light source device according to claim 6, wherein:
the wavelength converter includes a first wavelength conversion element made of nonlinear crystal using angle phase matching and a first holder for holding the first wavelength conversion element and setting an incident angle of the fundamental wave emitted from the laser cavity on the first wavelength conversion element in accordance with the oscillation wavelength of the laser cavity so as to satisfy an angle phase matching condition of the first wavelength conversion element; and
the controller controls the phase matching condition of the wavelength converter by means of the first holder.

8. A laser light source device according to claim 7, wherein:
the wavelength converter further includes a second wavelength conversion element made of nonlinear crystal using the angle phase matching and a second holder for holding the second wavelength conversion element and setting an incident angle of the fundamental wave emitted from the first wavelength conversion element on the second wavelength conversion element in accordance with the oscillation wavelength of the laser cavity so as to satisfy an angle phase matching condition of the second wavelength conversion element, the second holder being so arranged as to suppress a change of an optical axis caused by the first holder; and
the controller controls the phase matching condition of the wavelength converter by means of the first and second holders.

9. A laser light source device according to claim 6, wherein:
the wavelength converter includes a wavelength conversion element made of nonlinear crystal using temperature phase matching and a holder for holding the wavelength conversion element and setting the temperature of the wavelength conversion element in accordance with the oscillation wavelength of the laser cavity so as to satisfy a temperature phase matching condition of the wavelength conversion element; and
the controller controls the phase matching condition of the wavelength converter by means of the holder.

10. A laser light source device according to claim 6, wherein:
the wavelength converter includes a wavelength conversion element made of nonlinear crystal using quasi phase matching and having a polarization reversal period structure and a holder for holding the wavelength conversion element and causing the fundamental wave emitted from the laser cavity to be incident in a polarization reversal period area of the wavelength conversion element in accordance with the oscillation wavelength of the laser cavity so as to satisfy a quasi phase matching condition of the wavelength conversion element; and
the controller controls the phase matching condition of the wavelength converter by means of the holder.

11. A laser light source device according to claim 10, wherein:
the period of the polarization reversal period structure of the wavelength conversion element changes in a direction perpendicular to the incident direction of the fundamental wave emitted from the laser cavity; and
the holder includes a stage capable of moving the wavelength conversion element in such a direction as to change the period of the polarization reversal period structure in accordance with the oscillation wavelength of the laser cavity.

12. A laser light source device according to claim 10, wherein the period of the polarization reversal structure of the wavelength conversion element changes along the incident direction of the fundamental wave emitted from the laser cavity.

13. A laser light source device according to claim 1, wherein there are two reflection peaks each of which has an overlapping portion between the first and second fiber gratings.

14. A laser light source device according to claim 13, wherein the ranges of the respective reflection wavelengths of the two reflection peaks are 1000 to 1090 nm and 1100 to 1180 nm.

15. An image display device, comprising:
a laser light source device according to claim 1;
a projector control circuit including a wavelength determining circuit connected to the controller of the laser light source device for outputting a selection signal used to determine the oscillation wavelength of the laser light source device to the controller, and a luminance signal judging circuit for judging the luminance of a video signal based on a luminance signal included in the video signal to be displayed by a laser light emitted from the laser light source device;
a video mode switching unit for instructing the oscillation wavelength of the laser light source device inputted by a user of the image display device to the wavelength determining circuit; and
a power source control circuit for judging the type and remaining amount of a power source used by the image display device and outputting the judged type and remaining amount of the power source to the wavelength determining circuit.

16. A microscope device, comprising:
a laser light source device according to claim 1; and
a microscope unit for enabling the observation of the light emission of a fluorescent sample caused by the excitation of the fluorescent sample in response to the irradiation of a laser light emitted from the laser light source device.

* * * * *